(12) United States Patent
Fukuhara et al.

(10) Patent No.: US 8,620,075 B2
(45) Date of Patent: Dec. 31, 2013

(54) IMAGE PROCESSING DEVICE AND METHOD

(75) Inventors: Takahiro Fukuhara, Kanagawa (JP); Hitoshi Kiya, Tokyo (JP)

(73) Assignees: Sony Corporation, Tokyo (JP); Tokyo Metropolitan University, Tokyo (JP)

( * ) Notice: Subject to any disclaimer, the term of this patent is extended or adjusted under 35 U.S.C. 154(b) by 113 days.

(21) Appl. No.: 13/416,629

(22) Filed: Mar. 9, 2012

(65) Prior Publication Data

US 2012/0243784 A1 Sep. 27, 2012

(30) Foreign Application Priority Data

Mar. 24, 2011 (JP) ................................. 2011-066702
Dec. 13, 2011 (JP) ................................. 2011-272459

(51) Int. Cl.
*G06K 9/36* (2006.01)

(52) U.S. Cl.
USPC ........... 382/168; 382/162; 382/167; 382/173; 382/260; 382/254

(58) Field of Classification Search
USPC ................. 382/162, 167, 168, 173, 254, 260; 358/3.01, 3.23, 518, 522; 345/596, 345/690, 691, 697
See application file for complete search history.

(56) References Cited

U.S. PATENT DOCUMENTS

| 5,049,986 | A * | 9/1991 | Aono et al. ................... 358/522 |
| 6,201,893 | B1 * | 3/2001 | Shiraiwa et al. .............. 382/167 |
| 2005/0271270 | A1 * | 12/2005 | Hsieh et al. .................... 382/170 |
| 2006/0050084 | A1 * | 3/2006 | Jeffrey et al. ................. 345/617 |

OTHER PUBLICATIONS

Ito, T. et al., "A Study of Coding Method for High Bit Depth Image Using Bit Depth Transform". NTT Corporation, NTT Cyber Space Laboratories. 2009 General Meeting of the Institute of Electronics, Information and Communication Engineers.
Martin Winken et al., "Bit-Depth Scalable Video Coding" ICIP 2007, pp. 5-8.

* cited by examiner

*Primary Examiner* — Ali Bayat
(74) *Attorney, Agent, or Firm* — Frommer Lawrence & Haug LLP; William S. Frommer

(57) ABSTRACT

There is provided an image processing device which transforms an image with a bit depth of N into an upper layer with a bit depth of M and a remaining lower layer, including a histogram unit that generates histogram indicating occurrence frequency of each pixel value of an image with a bit depth of N, a table unit that generates a table listing pixel values of which occurrence frequency in the histogram generated by the histogram unit is equal to or more than one, a reordering unit that reorders an arrangement of values in the histogram using the table generated by the table unit, an update unit that updates the table generated by the table unit and the histogram reordered by the reordering unit; and an index image unit that generates an index image with a bit depth of N using the updated table and the updated histogram.

11 Claims, 28 Drawing Sheets

FIG.5

| 1 | 3 | 4 | 5 | 6 | 7 |
|---|---|---|---|---|---|
| 9 | 10 | 11 | 12 | 14 | 15 |
| 3 | 4 | 5 | 6 | 7 | 9 |
| 10 | 12 | 14 | 3 | 4 | 5 |
| 7 | 9 | 12 | 14 | 3 | 4 |
| 7 | 12 | 3 | 7 | 12 | 7 | P(x,y)

FIG.14

| 0 | 1 | 2 | 3 | 4 | 8 |
|---|---|---|---|---|---|
| 10 | 11 | 12 | 13 | 14 | 15 |
| 1 | 2 | 3 | 4 | 8 | 10 |
| 11 | 13 | 14 | 1 | 2 | 3 |
| 8 | 10 | 13 | 14 | 1 | 2 |
| 8 | 13 | 1 | 8 | 13 | 8 |

$I_N(x,y)$

FIG. 21
PHOTOGRAPHIC IMAGE ($u_0$=2981)
B
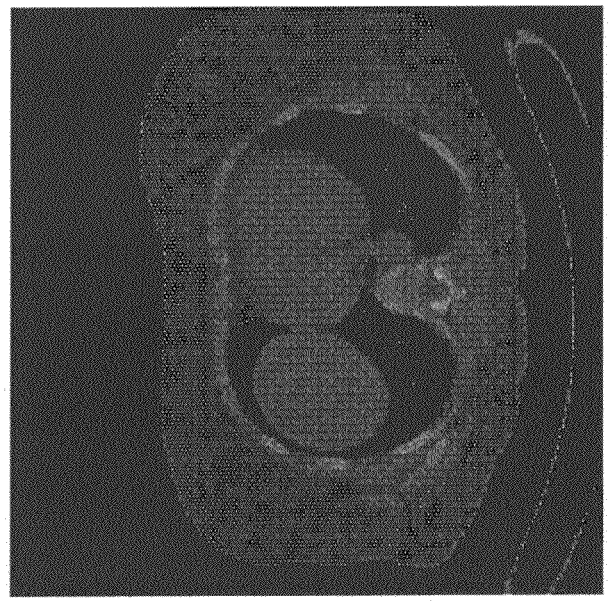
MEDICAL IMAGE ($u_0$=1853)
A

FIG.22

| PROCESSING | NUMBER M OF BITS OF UPPER LAYER | | | |
|---|---|---|---|---|
| | 11 BITS | 10 BITS | 9 BITS | 8 BITS |
| TRUNCATION | 75.47 | 67.04 | 60.08 | 53.65 |
| ROUNDING | 75.47 | 70.71 | 65.08 | 59.14 |
| LLOYD-MAX METHOD | 86.37 | 75.42 | 70.50 | 64.91 |
| Method - A | ∞ | 79.86 | 67.80 | 58.11 |
| Method - B | ∞ | 82.57 | 71.09 | 63.35 |
| Method - A (BLOCK DIVISION) | ∞ | 78.15 | 67.45 | 58.51 |
| Method - B (BLOCK DIVISION) | ∞ | 81.49 | 71.79 | 63.25 |

EXAMPLE OF MEDICAL IMAGE WITH N=12 BITS

FIG.23

| PROCESSING | NUMBER M OF BITS OF UPPER LAYER | | | |
|---|---|---|---|---|
| | 11 BITS | 10 BITS | 9 BITS | 8 BITS |
| TRUNCATION | 75.25 | 66.79 | 59.81 | 53.65 |
| ROUNDING | 75.25 | 70.47 | 64.85 | 59.14 |
| LLOYD-MAX METHOD | 77.33 | 73.29 | 67.38 | 64.91 |
| Method - A | 79.75 | 69.21 | 61.13 | 54.09 |
| Method - B | 79.77 | 72.26 | 65.74 | 62.41 |
| Method - A (BLOCK DIVISION) | 84.15 | 70.55 | 61.88 | 54.83 |
| Method - B (BLOCK DIVISION) | 84.39 | 73.94 | 66.79 | 60.36 |

EXAMPLE OF PHOTOGRAPHIC IMAGE WITH N=12 BITS

FIG.24

UPPER BIT IMAGE PSNR AND RECONSTRUCTED IMAGE PSNR [dB]

| M | METHOD | UPPER BIT IMAGE PSNR ($I_N(x,y)$ and $I_M(x,y)$) | RECONSTRUCTED IMAGE PSNR ($P_M(x,y)$ and $P(x,y)$) |
|---|---|---|---|
| 11 | PROPOSED METHOD | 79.78 | 79.77 |
| | EQUATION (3) ONLY | 82.44 | 20.69 |
| 10 | PROPOSED METHOD | 69.23 | 72.85 |
| | EQUATION (3) ONLY | 73.97 | 20.69 |
| 9 | PROPOSED METHOD | 61.14 | 66.15 |
| | EQUATION (3) ONLY | 66.56 | 16.08 |

FIG.25

AMOUNT OF INFORMATION
(VALUE IN PARENTHESIS INDICATES UNCOMPRESSED SIZE, IN BYTES)

| M | PROPOSED METHOD ($T_d(k)$) | Lloyd-max | PROPOSED METHOD ($T(k)$ DIRECT) |
|---|---|---|---|
| 11 | 146(8192) | 76(4096) | 3044(8192) |
| 10 | 207(8192) | 251(2048) | 3494(8192) |
| 9 | 211(8192) | 186(1024) | 2852(8192) |
| 8 | 205(8192) | 129(512) | 2070(8192) |

MEDICAL IMAGE

FIG.26

AMOUNT OF INFORMATION
(VALUE IN PARENTHESIS INDICATES UNCOMPRESSED SIZE, IN BYTES)

| M | PROPOSED METHOD ($T_d(k)$) | Lloyd - max | PROPOSED METHOD ($T(k)$ DIRECT) |
|---|---|---|---|
| 11 | 141(8192) | 256(4096) | 1561(8192) |
| 10 | 144(8192) | 226(2048) | 3006(8192) |
| 9 | 132(8192) | 156(1024) | 2485(8192) |
| 8 | 132(8192) | 117(512) | 2075(8192) |

PHOTOGRAPHIC IMAGE

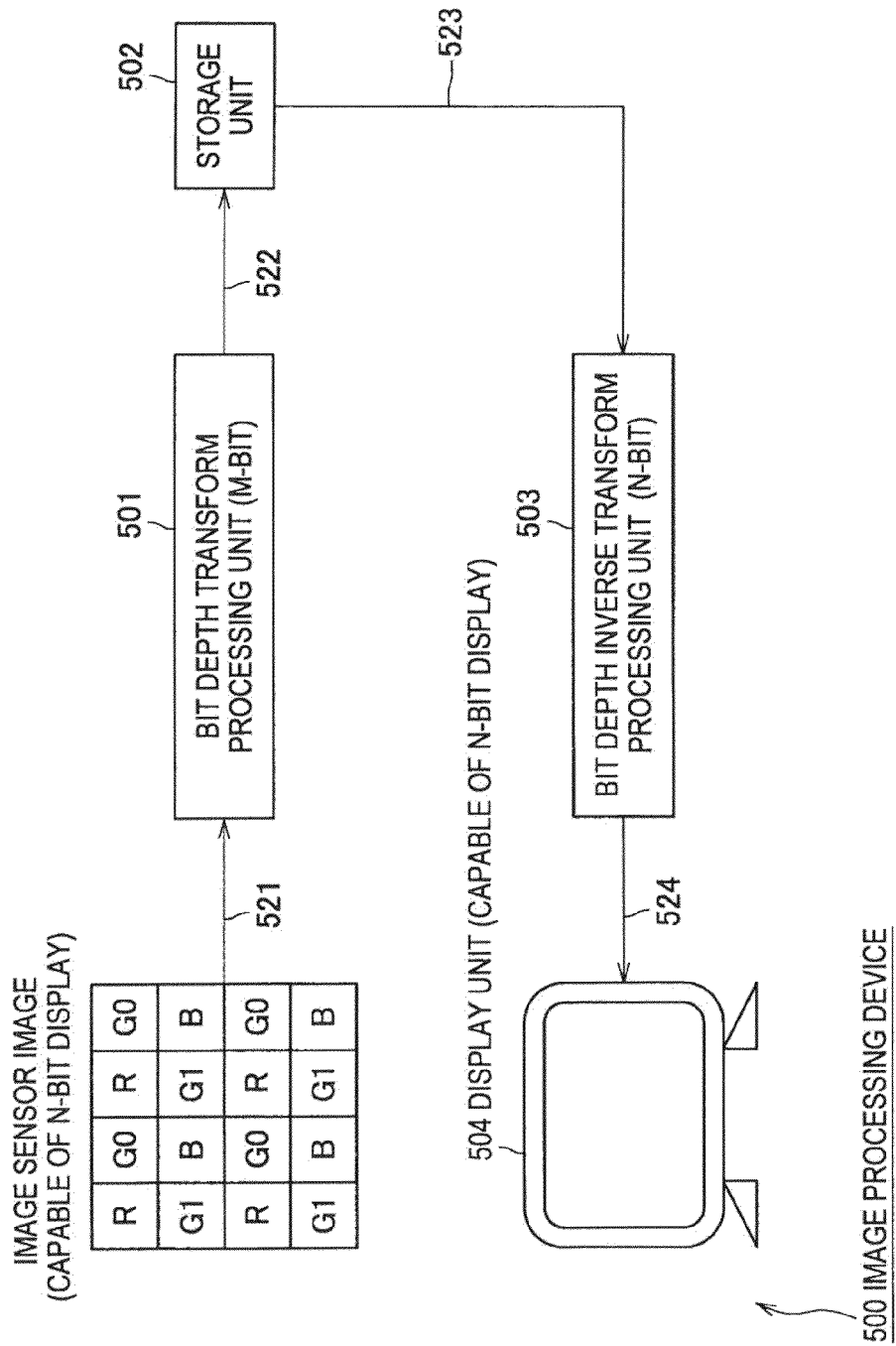

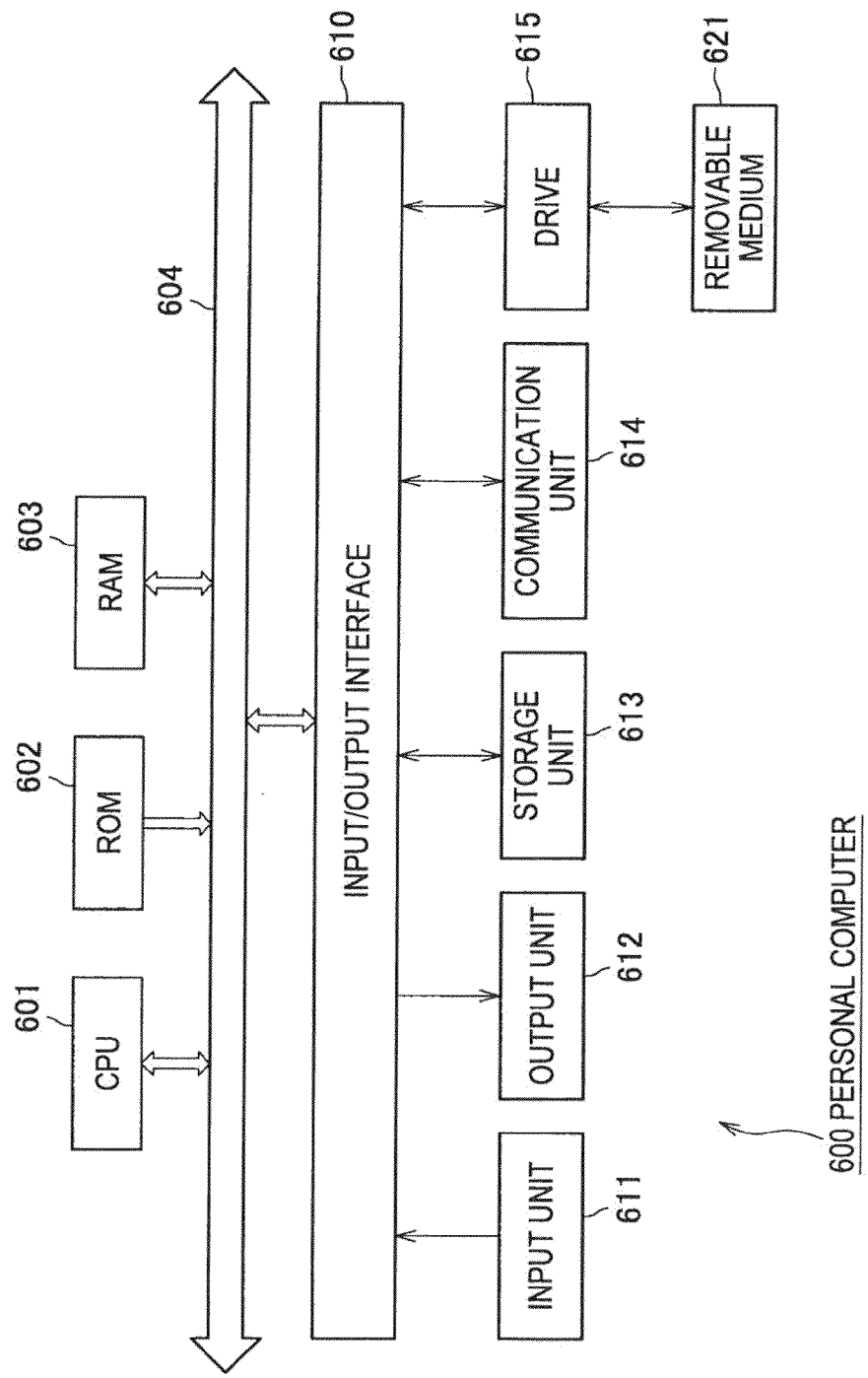

IMAGE PROCESSING DEVICE AND METHOD

BACKGROUND

The disclosure relates to an image processing device and method and, particularly, to an image processing device and method that enable lossless representation of high bit, depth images in bit depth transform of high bit depth images.

A large number of study results have been reported for coded representation of high bit depth images (for example, see M. Winken, D. Marpe, et al., "Bit-depth Scalable Video Coding", Proc. IEEE International Conference on Image Processing", pp. I-5 to I-7, 2007 and Ito, Bandoh, Takamura, Kamikura, Yashima, "A Study of Coding Method for High Bit Depth Image Using Bit Depth Transform", The 2009 IEICE General Conference, S-5, 2009).

In M. Winken et al., for example, a two-stage coding method that creates a low bit depth image by tone mapping and then encodes a difference between a decoded image thereof and an original image by another encoder is proposed.

Further, in Ito et al, for example, a method that applies Lloyd-Max quantization instead of tone mapping to achieve bit rate reduction at lossy compression is studied.

SUMMARY

However, in the above methods, the number of bits of a difference between the decoded image and the original image is large, which causes a failure to achieve lossless representation of the original image.

In light of the foregoing, it is desirable to achieve lossless representation of high bit depth images in bit depth transform of high bit depth images.

According to an embodiment of the present disclosure, there is provided an image processing device which transforms an image with a bit depth of N into an upper layer with a bit depth of M and a remaining lower layer, including a histogram generation unit that generates histogram indicating occurrence frequency of each pixel value of an image with a bit depth of N, a table generation unit that generates a table listing pixel values of which occurrence frequency in the histogram generated by the histogram generation unit is equal to or more than one, a reordering unit that reorders an arrangement of values in the histogram using the table generated by the table generation unit, an update unit that updates the table generated by the table generation unit and the histogram reordered by the reordering unit; and an index image generation unit that generates an index image with a bit depth of N using the table and the histogram updated by the update unit.

The update unit may update the table and the histogram by reordering an arrangement of values in the table and the histogram so as to minimize an error when a lower layer image with (N−M) bits is cut off.

The image processing device may further include a division unit that divides the image with a bit depth of N into a plurality of blocks. The histogram generation unit may generate the histogram independently for each block divided by the division unit, the table generation unit may generate the table independently for each block using the histogram of each block generated by the histogram generation unit, the reordering unit may reorder the histogram of each block using the table of each block generated by the table generation unit, the update unit may update the table of each block and the histogram of each block reordered by the reordering unit, and the index image generation unit may generate the index image independently for each block using the table of each block and the histogram of each block updated by the update unit.

The image processing device may further include a control unit that selects a method of bit depth transform; and a Lloyd-Max quantization unit that performs quantization by Lloyd-Max method. The control unit may detect number of pixels X of which occurrence frequency is equal to or more than one from the histogram generated by the histogram generation unit and, when $X>(2^M-1)$ and $(N-M) \geq P$ are satisfied, control the Lloyd-Max quantization unit to perform bit depth transform by Lloyd-Max method, and, in other cases, control the table generation unit, the reordering unit, the update unit and the index image generation unit to generate the index image.

A value of a variable P may be 2.

According to another embodiment of the present disclosure, there is provided an image processing method of an image processing device which transforms an image with a bit depth of N into an upper layer with a bit depth of M and a remaining lower layer, including generating histogram indicating occurrence frequency of each pixel value of an image with a bit depth of N by a histogram generation unit, generating a table listing pixel values of which occurrence frequency in the generated histogram is equal to or more than one by a table generation unit, reordering an arrangement of values in the histogram using the generated table by a reordering unit, updating the generated table and the reordered histogram by the an update unit; and generating an index image with a bit depth of N using the updated table and the updated histogram by the an index image generation unit.

According to yet another embodiment of the present disclosure, there is provided an image processing device including a reconstructed image generation unit that reconstructs an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table; and an upper layer image generation unit that separates the index image with a bit depth of N into an upper layer index image with a bit depth of M and a lower layer index image with (N−M) bits and reconstructs the image with a bit depth of N using the index image with a bit depth of M and the updated table.

The reconstructed image generation unit may reconstruct a block image with a bit depth of N using the index image with a bit depth of N of each block and the updated table of each block.

The upper layer image generation unit may reconstruct a block image with a bit depth of N using the index image with a bit depth of M of each block and the updated table of each block.

The upper layer image generation unit may detect number of pixels X of which occurrence frequency is equal to or more than one from the histogram and, when $X \leq (2^M-1)$ is satisfied, separate the index image with a bit depth of N into an upper layer index image with a bit depth of M and a lower layer index image with (N−M) bits.

According to yet another embodiment of the present disclosure, there is provided an image processing method of an image processing device including reconstructing an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table, by a reconstructed image generation unit; and separating the index image with a bit depth of N into an upper layer index image with a bit depth of M and a lower layer index image with (N−M) bits and reconstructing the image with a bit depth of N using the index image with a bit depth of M and the updated table, by an upper layer image generation unit.

According to an embodiment of the present disclosure, histogram indicating occurrence frequency of each pixel value of an image with a bit depth of N is generated, a table listing pixel values of which occurrence frequency in the generation histogram is equal to or more than one is generated, an arrangement of values in the histogram is reordered using the generated table, the generated table and the reordered histogram are updated, and an index image with a bit depth of N is generated using the updated table and the updated histogram.

According to anther embodiment of the present disclosure, an image with a bit depth of N is reconstructed using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table, and the index image with a bit depth of N is separated into an upper layer index image with a bit depth of M and a lower layer index image with (N−M) bits, and the image with a bit depth of N is reconstructed using the index image with a bit depth of M and the updated table.

According to the embodiments of the present disclosure described above, images can be processed. Particularly, lossless representation of high bit depth images can be achieved in bit depth transform of high bit depth images.

BRIEF DESCRIPTION OF THE DRAWINGS

FIG. 5 is a diagram showing an example of pixel values of a high bit depth image;

FIG. 14 is a diagram to explain an example of obtaining an index image;

FIG. 21 is a view showing an example of an input image;

FIG. 22 is a diagram showing an example of a bit depth transform process result;

FIG. 23 is a diagram showing another example of a bit depth transform process result;

FIG. 24 is a diagram showing an example of PSNR of an upper bit image and PSNR of a reconstructed image;

FIG. 25 is a diagram showing an example of amount of information of a table for a medial image;

FIG. 26 is a diagram showing an example of amount of information of a table for a photographic image;

FIG. 27 is a block diagram showing a typical configuration example of an image processing device; and FIG. 28 is a block diagram showing a configuration example of a personal computer.

DETAILED DESCRIPTION OF THE EMBODIMENT(S)

Figure 1:
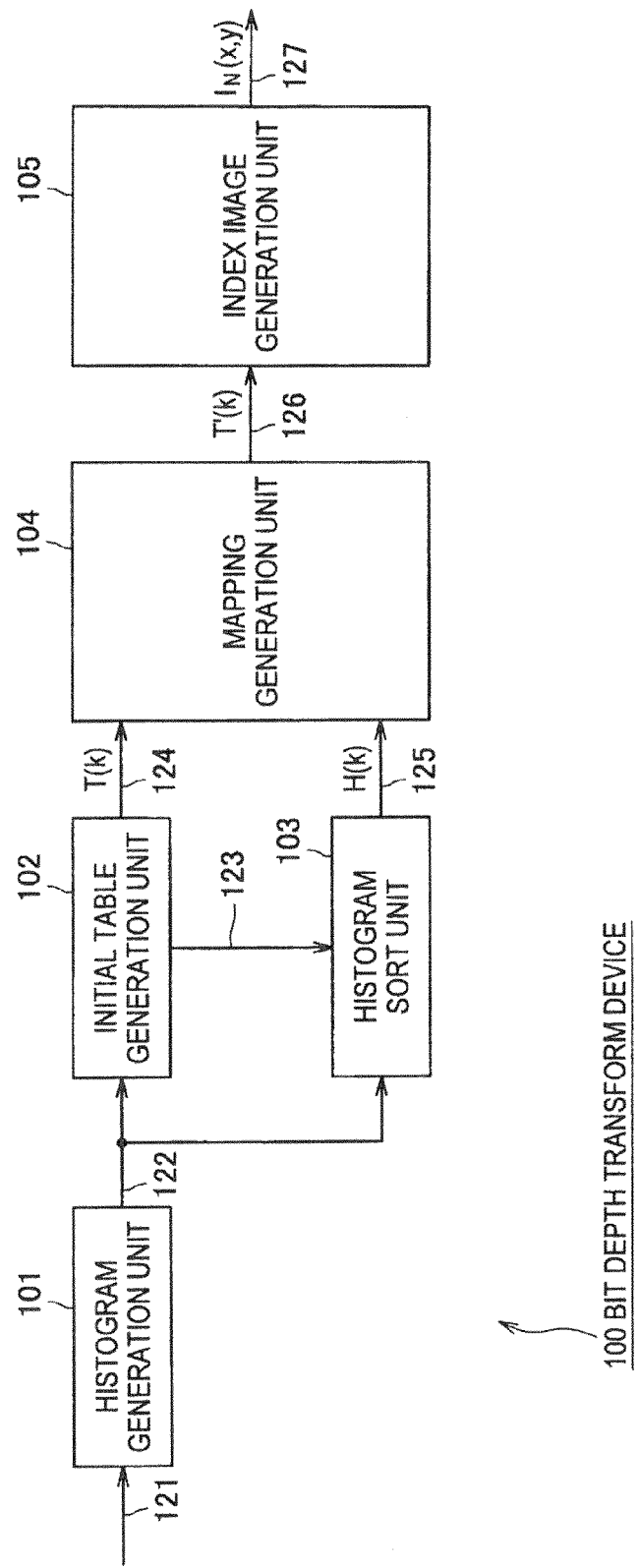
FIG. 1 is a block diagram showing a typical configuration example of a bit depth transform device.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Mode for carrying out the technology (which is referred to hereinafter as "embodiment") is described hereinafter. Note that the explanation follows the order given below.

1. First Embodiment (Bit Depth Transform Device)
2. Second Embodiment (Bit Depth Inverse Transform Device)
3. Third Embodiment (Bit Depth Transform Device)
4. Fourth Embodiment (Bit Depth Inverse Transform Device)
5. Fifth Embodiment (Test Example)
6. Sixth Embodiment (Image Processing Device)
7. Seventh Embodiment (Personal Computer)

<1. First Embodiment>
[Bit Depth Transform Device]

FIG. 1 is a block diagram showing a typical configuration example of a bit depth transform device. A bit depth transform device shown in FIG. 1 is an image processing device that receives an image with a high bit depth (high bit depth image) as an input image and generates an index image capable of representing the high bit depth image in a lossless manner (without a loss).

Specifically, the bit depth transform device 100 implements two-layer image representation that separates an N-bit HDR (High Dynamic Range) image into an M-bit (N>=M) upper bit portion and lower difference information. The necessary conditions for this method are to have the following features.

Figure 2:
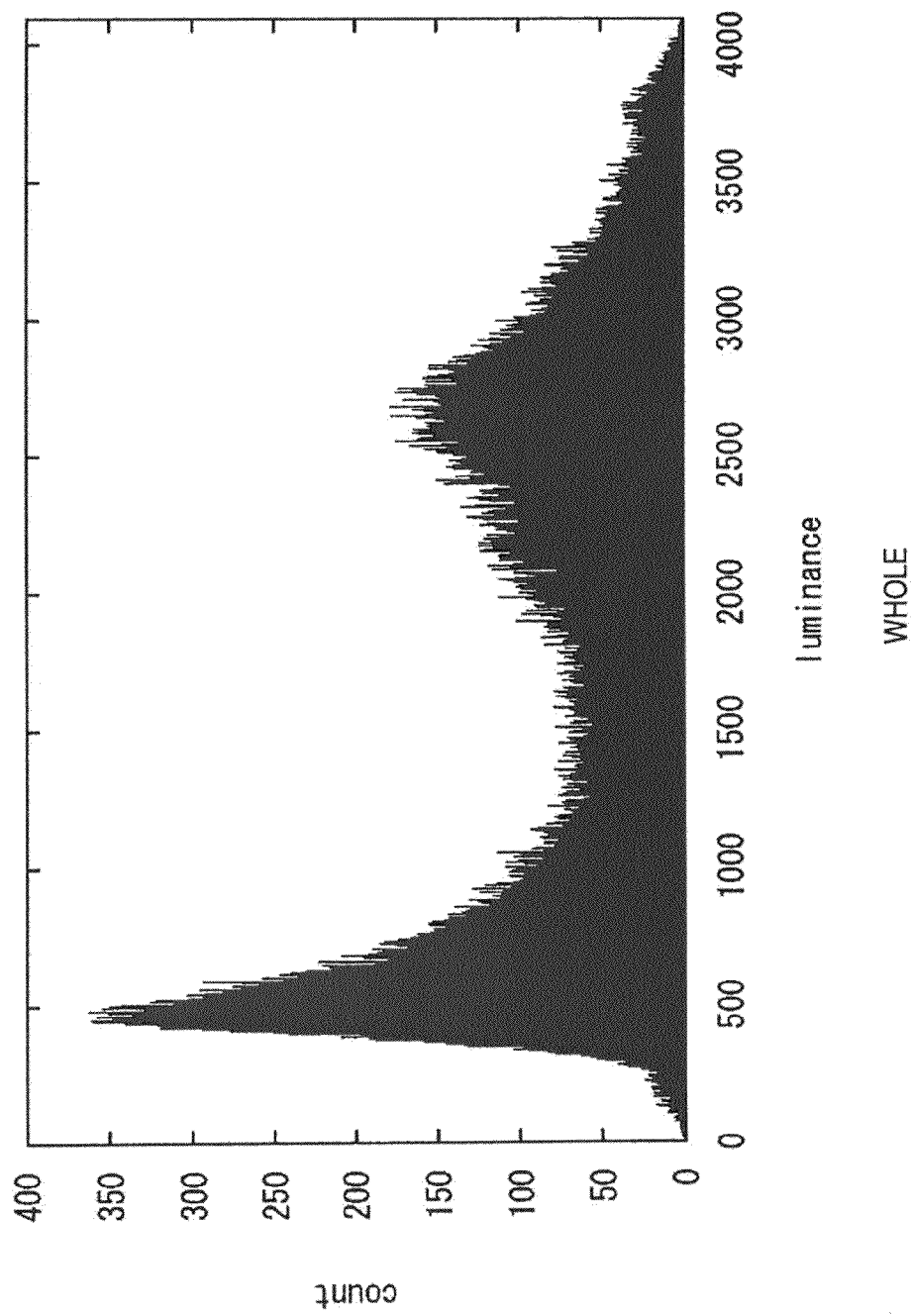
FIG. 2 is a diagram showing an example of a whole histogram of a 12-bit image.
Figure 3:
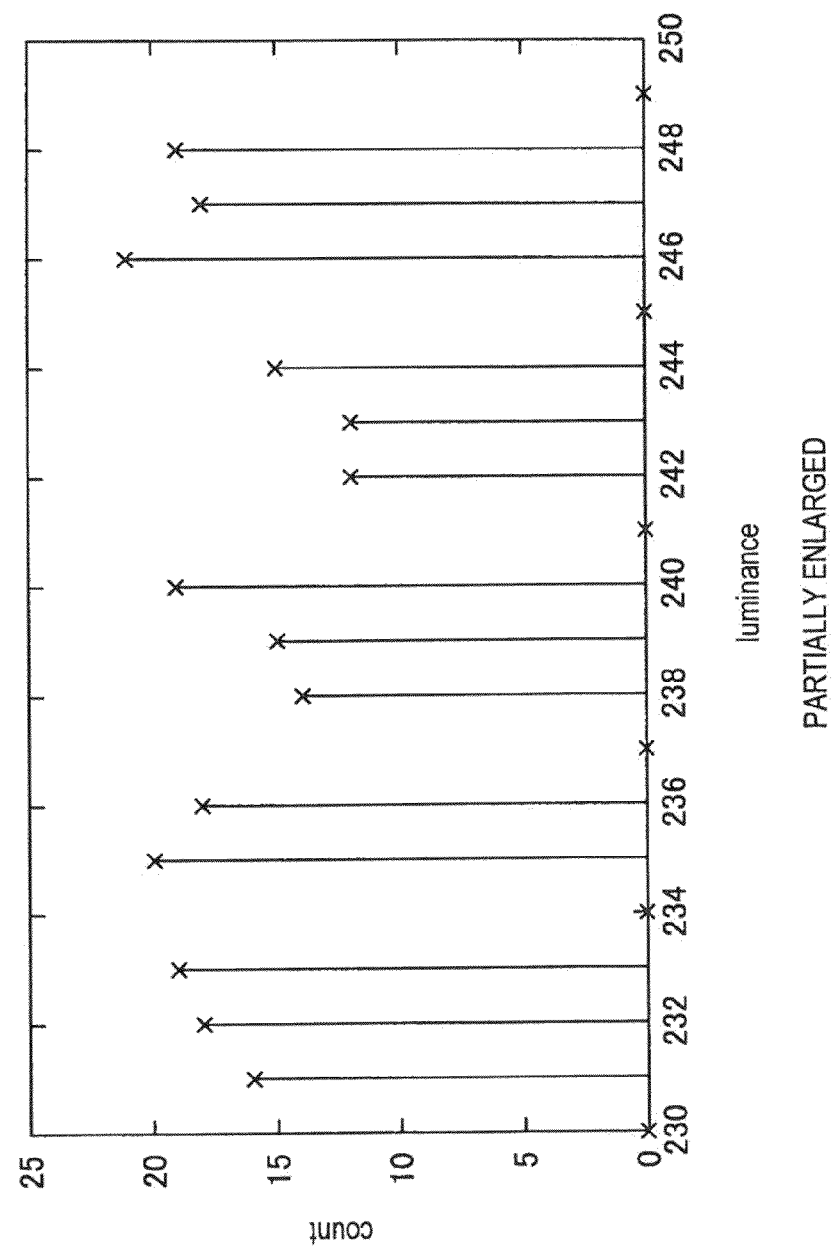
FIG. 3 is a diagram showing an example of a partial enlargement of a histogram of a 12-bit image.

(A) Represent an image in two layers, and achieve high PSNR even when the image is reconstructed using only the first layer (B) Achieve lossless representation allowing restoration of an original HDR image when information of all two layers are obtained To satisfy the above two conditions, the bit depth transform device 100 pays attention to the deviation of a histogram of an image and the sparseness of an image. A histogram of an image generally has a deviation in frequency, and not all of 2N kinds of luminance values are used. FIG. 2 shows an example of a histogram that is generated for an image with a bit depth of 12. FIG. 2 is a diagram showing a whole histogram. FIG. 3 is a partial enlargement of FIG. 2.

Although it seems that all luminance values are used when referring to FIG. 2, there are actually luminance values which are not used as shown in FIG. 3. In other words, most of images generally have sparse histograms. In view of this, the bit depth transform device 100 performs mapping for the entire image again utilizing the deviation and the sparseness of the image. This processing is performed within the constraints of the condition (B) so that an error when a lower layer is cut off is small (the condition (A)).

It should be noted that, although a bit depth of nine bits or more is a high bit depth in the following description for convenience of explanation, the technology is not limited by the amount of bit depth.

As shown in FIG. 1, the bit depth transform device 100 includes a histogram generation unit 101, an initial table generation unit 102, a histogram sort unit 103, a mapping generation unit 104, and an index image generation unit 105.

[Flow of Bit Depth Transform Process]

Figure 4:
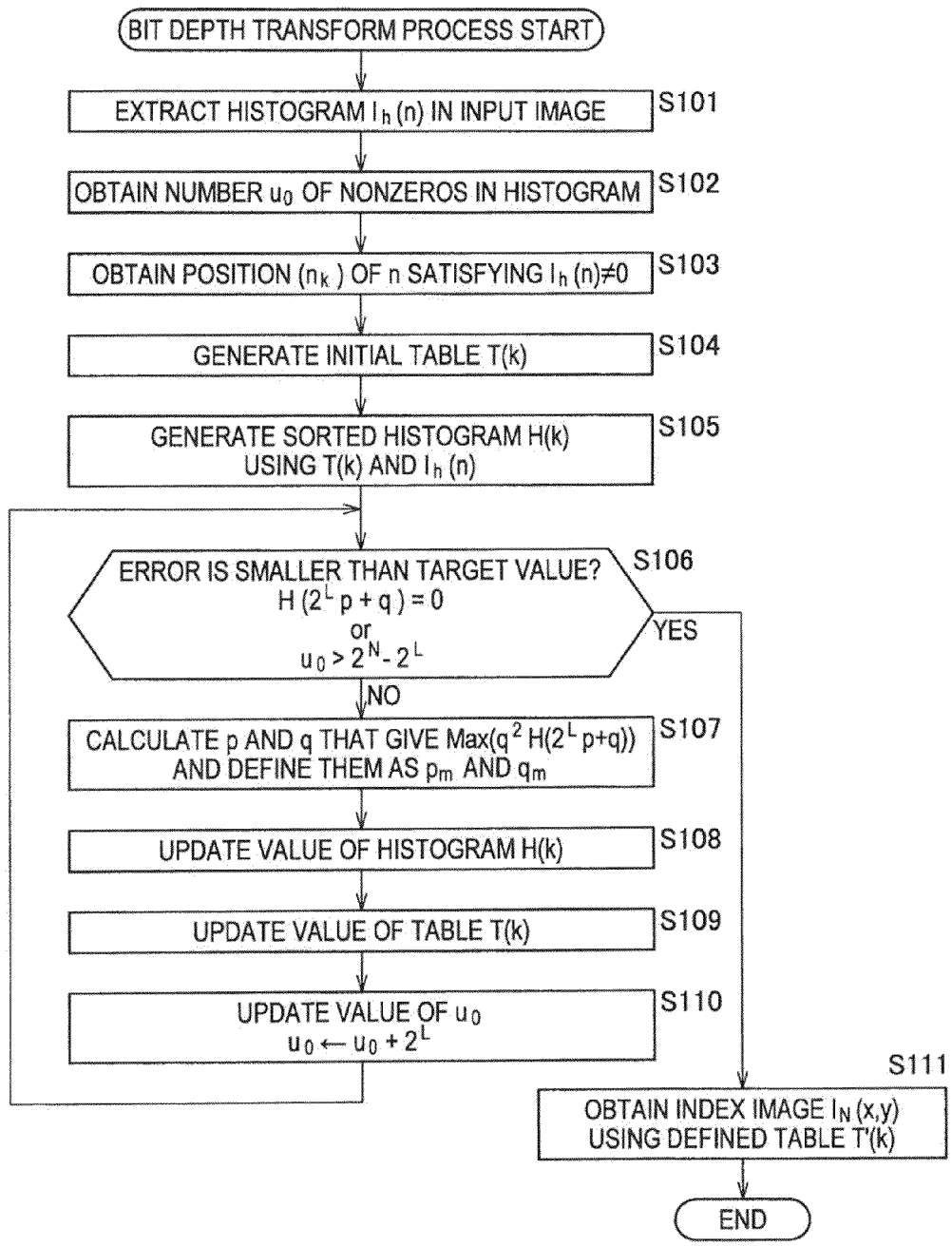
FIG. 4 is a flowchart to explain an example of a flow of a bit depth transform process.

Processing executed by each element of the bit depth transform device 100 is described through description of an example of a flow of a bit depth transform process with reference to a flowchart of FIG. 4. Further, reference is made also to FIGS. 5 to 14 as appropriate.

Figure 6:
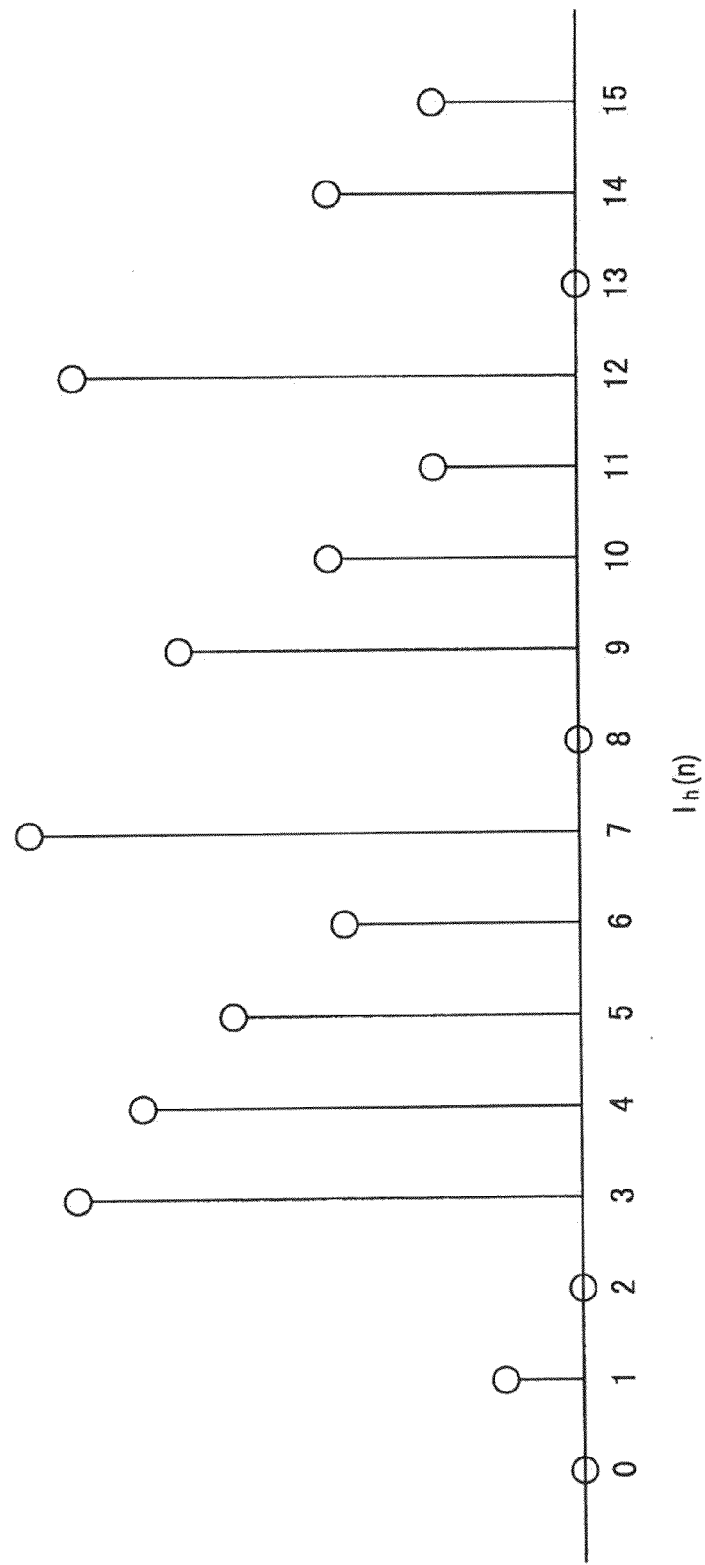
FIG. 6 is a diagram showing an example of a histogram distribution.

First, upon input of an input image P(x,y) with a bit depth of N (arrow 121 in FIG. 1), the histogram generation unit 101 generates (extracts) a histogram $I_h(n)$ of pixel values that actually occur in the input image P(x,y) in Step S101. For example, when a two-dimensional image of the input image P(x,y) has values as shown in FIG. 5, the distribution of the histogram $I_h(n)$ is as shown in FIG. 6. In the case of this example, the occurrence frequency of pixel values 0, 2, 8 and 13 is zero.

Generally, high bit depth images have features that the variety of pixel values is small, that is, the distribution of a histogram is sparse in many cases. Thus, in high bit depth images, there are often a large number of pixel values of which occurrence frequency is zero.

In Step S102, the histogram generation unit 101 obtains the number u0 (which is hereinafter referred to also as "number of nonzeros"; $u_0$=12 in the example of FIG. 6) of pixel values of which occurrence frequency in the histogram $I_h(n)$ generated in Step S101 is not zero (hereinafter referred to also as "nonzero coefficient"). Further, in Step S103, the histogram generation unit 101 obtains a position $n_k$ (hereinafter referred to also as "nonzero position") of the nonzero coefficient (a position of n satisfying $I_h(n) \neq 0$).

After obtaining the histogram $I_h(n)$, the number of nonzeros $u_0$, and the nonzero position $n_k$, the histogram generation unit 101 supplies them as a set (histogram information) to the initial table generation unit 102 and the histogram sort unit 103 (arrow 122 in FIG. 1).

Figure 7:
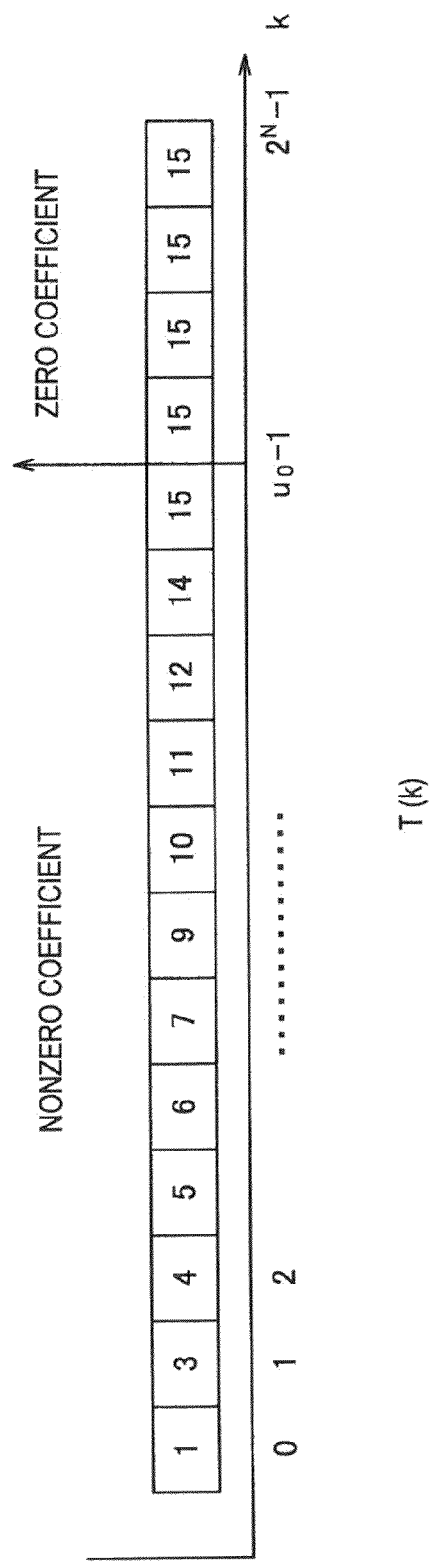
FIG. 7 is a diagram showing an example of an initial table.

In Step S104, the initial table generation unit 102 generates an initial table T(k) using the histogram information supplied from the histogram generation unit 101. FIG. 7 shows an example of the initial table T(k). As shown in FIG. 7, in the initial table T(k), $u_0$ number of nonzero coefficients are sequentially arranged from the left, and zero coefficients (pixel values of which occurrence frequency is zero) are arranged after that. In this example, values at the $u_0$-th position $n_k$ are displayed consecutively for the sake of convenience. This is also convenient in terms of indicating that the subsequent coefficient is a zero coefficient. Note that the initial table T(k) can be formulated as the following expression (1).

$$T(k) = \begin{cases} n_k & (k = 0, 1, \ldots, u_0 - 1) \\ n_{u_0-1} & (k = u_0, u_0+1, \ldots, 2^N - 1) \end{cases} \quad (1)$$

The initial table generation unit 102 supplies the initial table T(k) generated in the above manner to the histogram sort unit 103 (arrow 123 in FIG. 1). Further, the initial table generation unit 102 supplies the generated initial table T(k) also to the mapping generation unit 104 (arrow 124 in FIG. 1).

In Step S105, the histogram sort unit 103 generates a new (sorted) histogram H(k) in which coefficients are reordered using the information generated in Steps S101 to S104 (the histogram $I_h(n)$, the number of nonzeros $u_0$, the nonzero position $n_k$, and the initial table T(k)). For example, the histogram sort unit 103 generates the histogram H(k) by the following expression (2).

$$H(k) = \begin{cases} I_h(n_k) & (k = 0, 1, \ldots, u_0 - 1) \\ 0 & (k = u_0, u_0+1, \ldots, 2^N - 1) \end{cases} \quad (2)$$

Note that, in the non-used part of the table, the same value as the last value is entered not to disturb the monotone increase.

Figure 8:
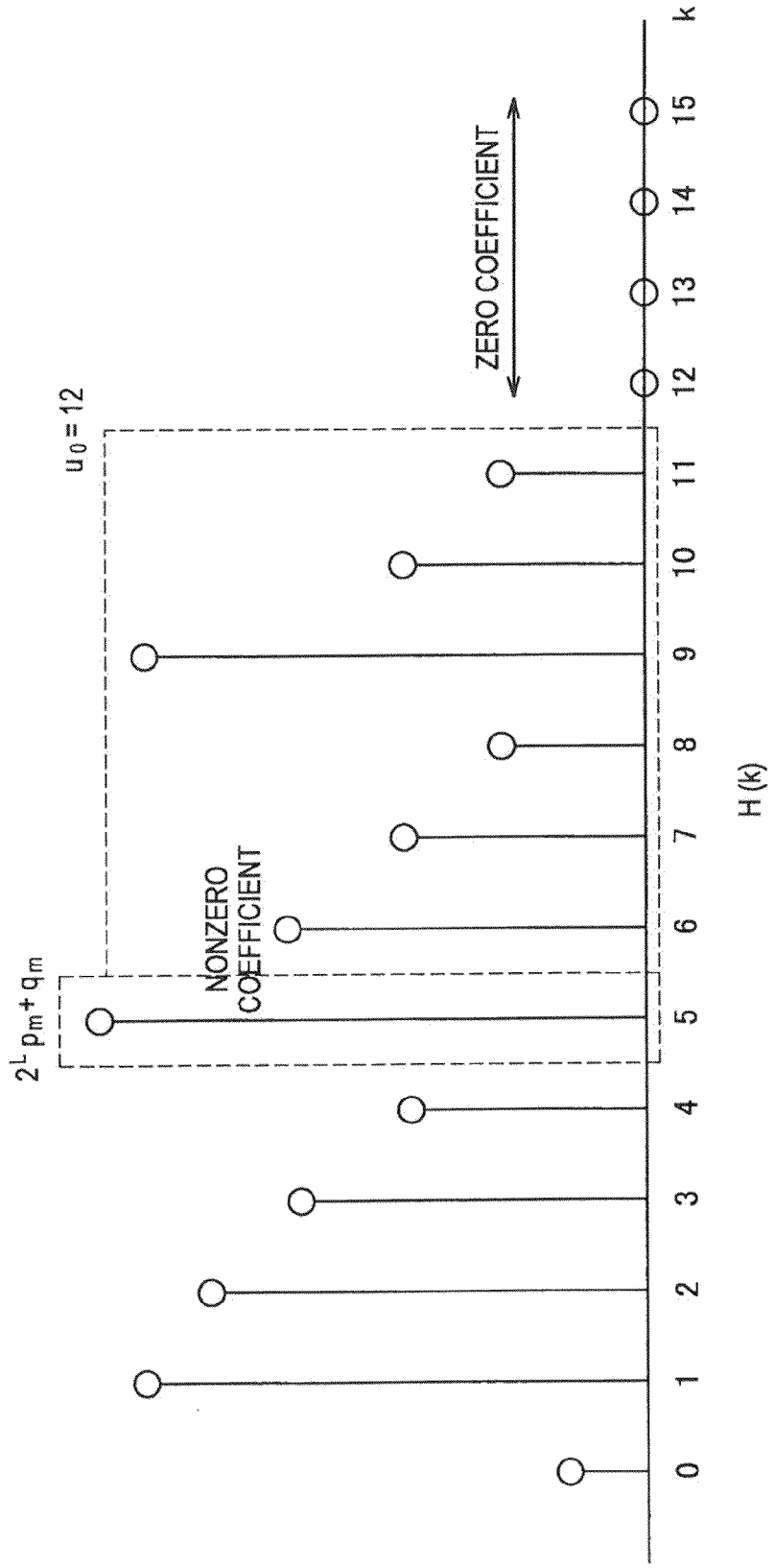
FIG. 8 is a diagram showing an example of a sorted histogram.

FIG. 8 shows an example of the histogram H(k). After generating the histogram H(k), the histogram sort unit 103 supplies the histogram H(k) to the mapping generation unit 104 (arrow 125 in FIG. 1).

The mapping generation unit 104 receives the initial table T(k) and the histogram H(k) and updates the initial table T(k), and supplies a finalized table T'(k) to the index image generation unit 105 (arrow 126 in FIG. 1). Specifically, the mapping generation unit 104 performs processing of Steps S106 to S110 of FIG. 4.

At this time, the mapping generation unit 104 performs mapping in such a way that an error when a lower layer is cut off is small. To be more specific, the mapping generation unit 104 aims at minimizing an error of an index image $I_M(x,y)$ in the case where a lower layer with L=N−M bits is cut off from an index image $I_N(x,y)$ with N bits. Problem setting is as shown in the following expressions (3) and (4).

$$\min MSE = \sum_x \sum_y (I_N(x, y) - I_M(x, y))^2 \quad (3)$$

$$\text{subject to } T(k) \leq T(k+1), (k=0, 1, \ldots, u_0-1) \quad (4)$$

The above-described expression (3) can be reformulated using the histogram. H(k). First, an error that occurs when cutting off lower L bits in a given pixel of the index image $I_N(x,y)$ is q, ($1 \leq q < 2L$). In the whole $I_M(x,y)$, the frequency Hq of occurrence of an error value q can be represented as the following expression (5) using the histogram H(k).

$$H_q = \sum_{P=0}^{2^P-1} H(2^L p + q) \qquad (5)$$

Accordingly, the above-described expression (3) can be reformulated to the table of the following expression (6).

$$\text{Min } MSE = \sum_{q=1}^{2^L-1} q^2 \cdot H_q \qquad (6)$$

$$= \sum_{q=1}^{2^L-1} \sum_{p=0}^{2^P-1} q^2 \cdot H(2^L p + q)$$

Therefore, the optimization issue of the index image comes down to the mapping issue of the histogram H(k) and the table T(k).

From the above-described expression (6), the frequency $H(2^L p)$ in the position $2^L p$ (q=0) does not affect MSE. Thus, the value of MSE can be reduced by shifting several pixel values to the position $2^L p$ (q=0, 1, ..., $2^M-1$) according to the order of frequency. Because there are a total $2^M$ number of positions $2^L p$, mapping is performed on the basis of this guideline as long as the histogram is sparse. The procedure is as follows.

The mapping generation unit 104 determines whether an error is smaller than a target value or not in Step S106 of FIG. 4. Specifically, the mapping generation unit 104 determines whether at least one of the following expressions (7) and (8) is established or not.

$$H(2^L p+q)=0, \; (0 \leq p < 2^M, 1 \leq q < 2^L) \qquad (7)$$

$$u_0 > 2^N - 2^L \qquad (8)$$

The expression (7) is the condition that there is no pixel value in the position other than $2^L p$. When this condition is satisfied, an error by cutoff of lower bits does not occur. Further, the expression (8) means that there is no available position $2^L p$. As described later, because the value of $u_0$ increases by $2^L$ each time shifting the histogram and the table, this condition is eventually satisfied and the mapping ends.

In Step S106 where such determination is made, when it is determined that an error is not smaller than a target value, that is, neither of the expressions (7) and (8) is established, the mapping generation unit 104 moves the process forward to Step S107.

In Step S107, the mapping generation unit 104 detects a combination a combination of p and q that gives the maximum value of $q^2 H(2^L p+q)$ and defines them as $p_m$ and $q_m$.

Figure 9:
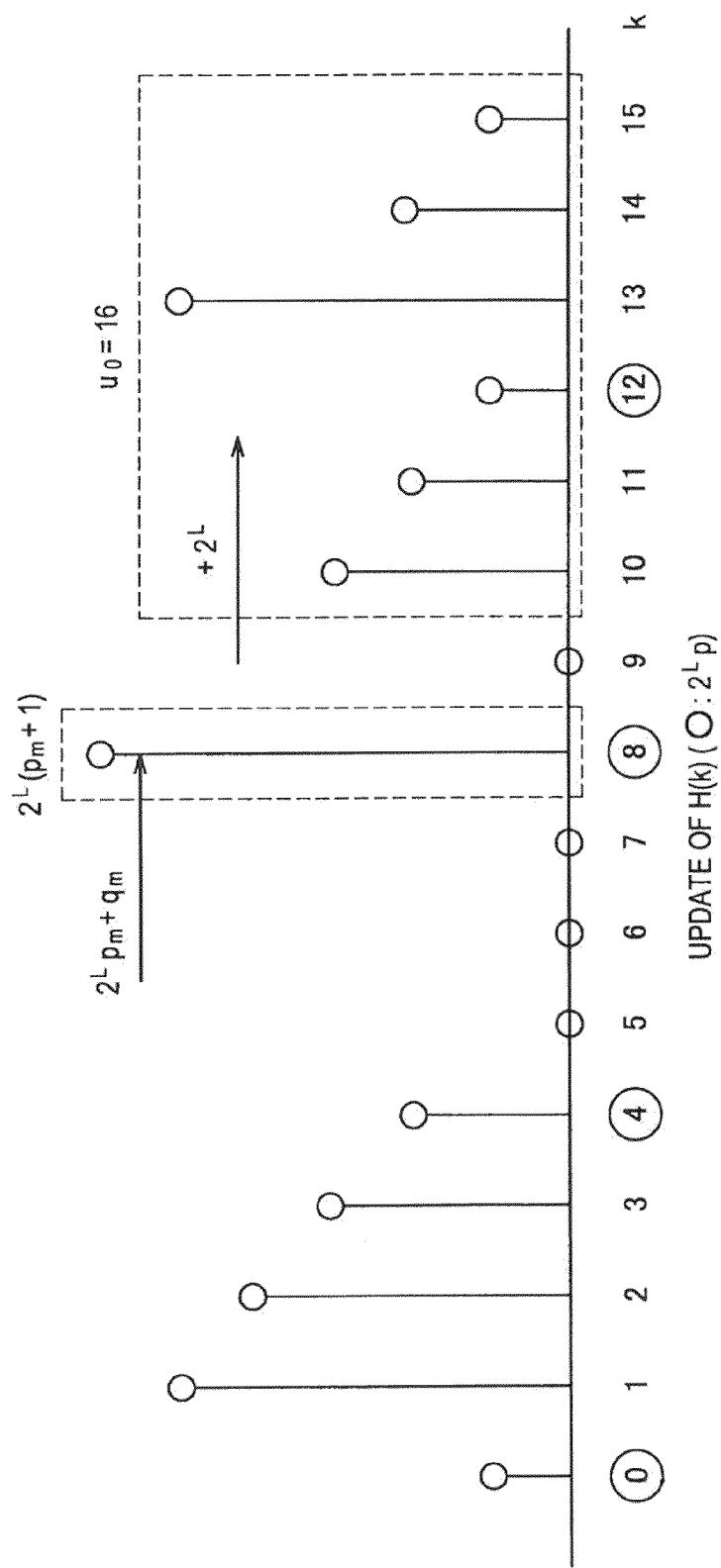
FIG. 9 is a diagram showing an example of update of H(k)

In Step S108, the mapping generation unit 104 updates the value of the histogram H(k) according to the following expression (9). Specifically, the mapping generation unit 104 shifts the histogram H(k) in $k=2^L p_m+q_m+1, \ldots, u_0-1$ to the position $k+2^L$ as shown in FIG. 9. After that, the mapping generation unit 104 shifts the histogram $H(2^L p_m+q_m)$ in $2^L p_m+q_m$ to the position $2^L(p_m+1)$. H(k) is thereby updated as the following expression (9).

$$H(k) \leftarrow \begin{cases} H(k), & (0 \leq k < 2^L p_m + q_m) \\ 0, & (2^L p_m + q_m \leq k < 2^L(p_m+1)) \\ H(2^L p_m + q_m), & (k = 2^L(p_m+1)) \\ 0, & (2^L(p_m+1) < k \leq 2^L(p_m+1) + q_m) \\ H(k-2^L), & (2^L(p_m+1) + q_m < k < u_o + 2^L) \end{cases} \qquad (9)$$

Figure 10:
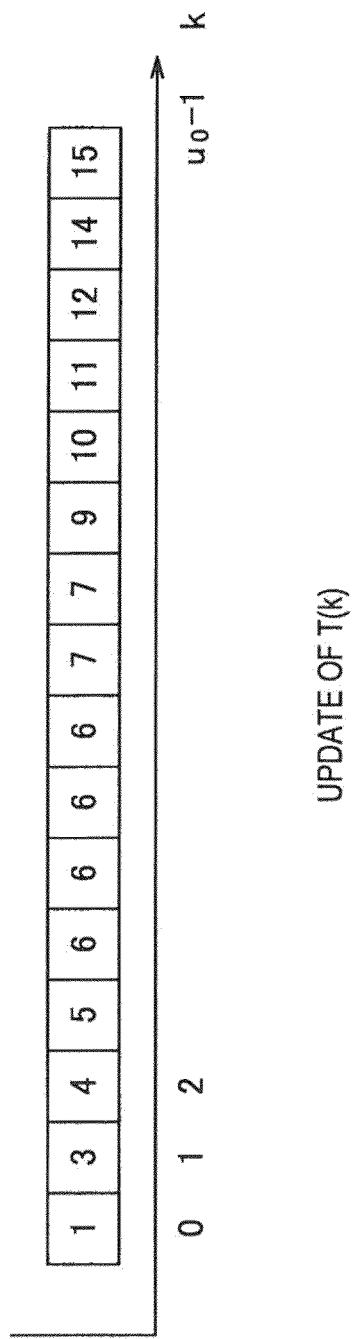
FIG. 10 is a diagram showing an example of update of T(k)

In Step S109, the mapping generation unit 104 updates the values of the table T(k) of pixel values in the same manner as the case of the histogram H(k). Note that, however, as shown in FIG. 10, the mapping generation unit 104 holds the previous table value as a table value corresponding to a part where the histogram is set to zero in order not to disturb the monotone increase property of T(k). As a result, the table T(k) is updated as the following expression (10).

$$T(k) \leftarrow \begin{cases} T(k), & (0 \leq k < 2^L p_m + q_m) \\ T(2^L p_m + q_m - 1), & (2^L p_m + q_m \leq k < 2^L(p_m+1)) \\ T(2^L p_m + q_m), & (k = 2^L(p_m+1)) \\ T(2^L p_m + q_m), & (2^L(p_m+1) < k \leq 2^L(p_m+1) + q_m) \\ T(k-2^L), & (2^L(p_m+1) + q_m < k < u_o + 2^L) \end{cases} \qquad (10)$$

In Step S110, the mapping generation unit 104 updates the value of $u_0$ as shown in the following expression (11).

$$u_0 \leftarrow u_0 + 2^L \qquad (11)$$

After the processing of Step S110, the mapping generation unit 104 moves the process back to Step S106. in other words, the mapping generation unit 104 repeats the processing of Steps S106 to S110 until an error becomes smaller than a target value.

Figure 11:
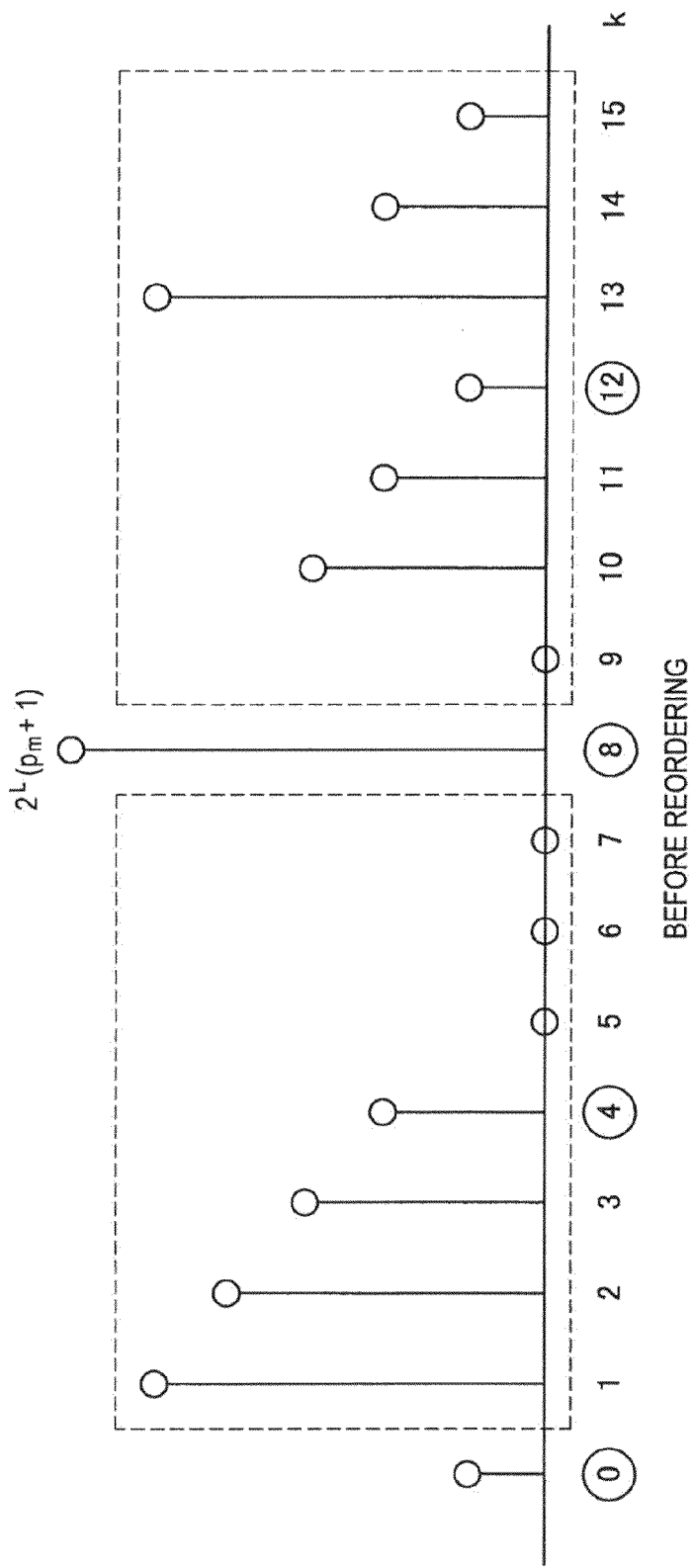
FIG. 11 is a diagram to explain flexibility of placement of H(k)=0 in a histogram.
Figure 12:
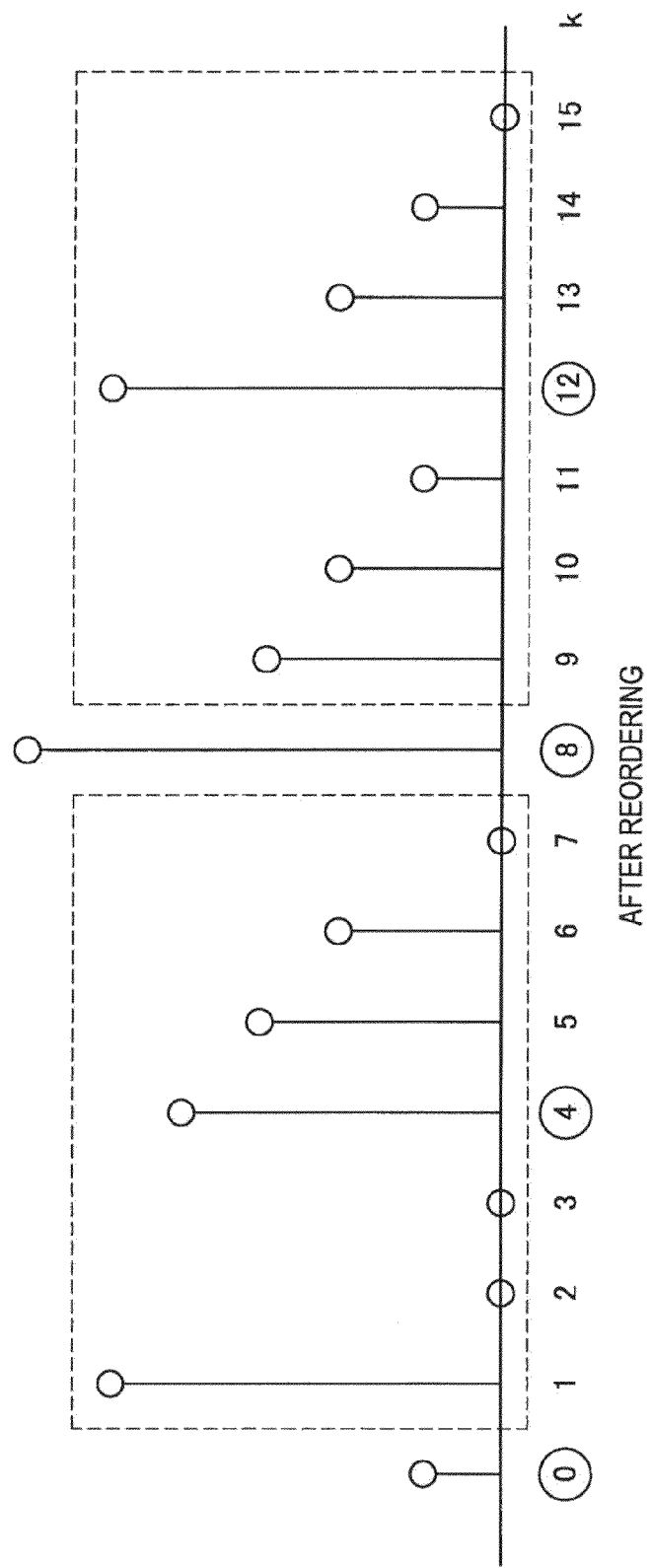
FIG. 12 is a diagram to explain flexibility of placement of H(k)=0 in a histogram.

An algorithm of the disclosure does not completely satisfy the above-described expression (6). For example, although zero values are entered into the histogram in the processing of Step S108, there is flexibility in entering zero values. In the algorithm of the disclosure, zero values are entered as shown in FIG. 11, for example; however, MSE in the expression (6) can be further reduced to a lower value by adjusting the positions of zero values as shown in FIG. 12.

When it is determined in Step S106 that an error has become smaller than a target value, that is, when the expression (7) or (8) is established, the mapping generation unit 104 supplies the finalized table T'(k) to the index image generation unit 105 (arrow 126 in FIG. 1) and moves the process forward to Step S111.

Figure 13:
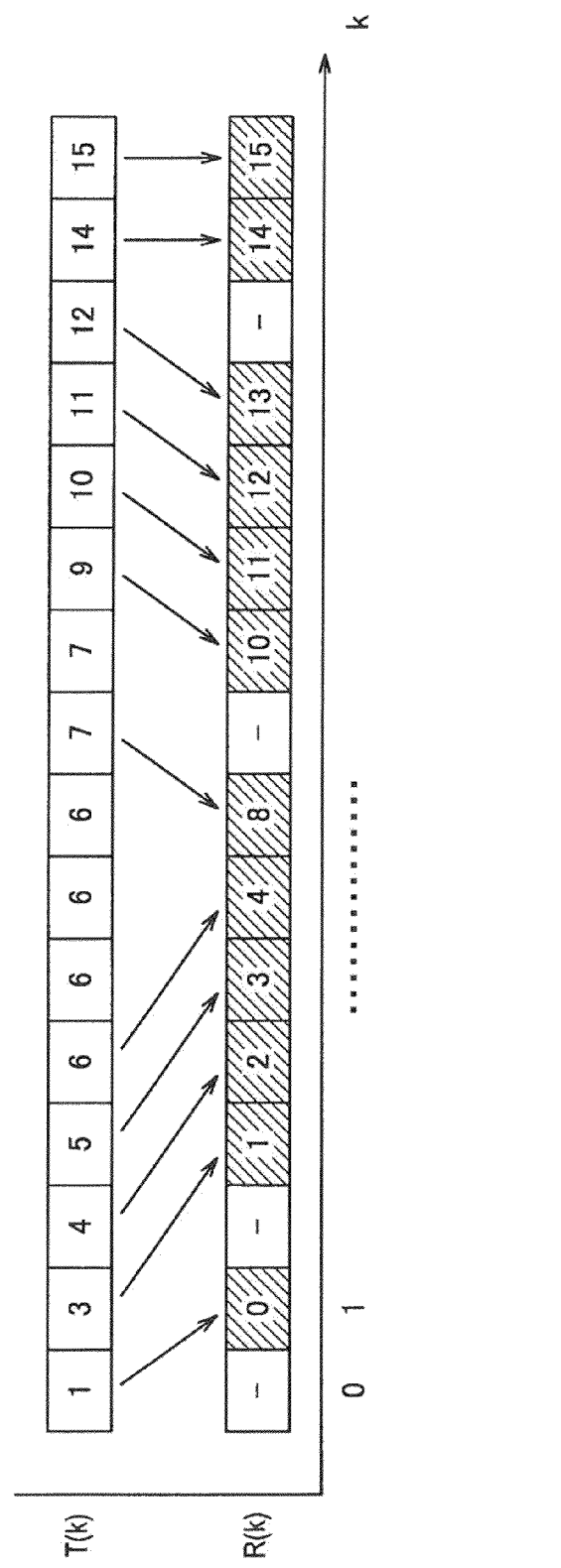
FIG. 13 is a diagram to explain an example of obtaining an index image.

In Step S111, the index image generation unit 105 obtains an index image $I_N(x,y)$ using the finalized table T'(k). Although there are several methods of obtaining the index image $I_N(x,y)$, a function R(k) that reversely obtains a value of the table T(k) ($0 \leq k < 2^N$) from pixel values of an original image P(x,y) is defined as the following expression (12) as shown in FIG. 13, for example.

$$\begin{cases} R(T(0)) = 0 \\ R(T(k)) = k, & \text{If } T(k) - T(k-1) > 0 \\ R(T(k)) = 0, & \text{If } T(k) - T(k-1) = 0 \end{cases} \qquad (12)$$

Where $k = 1, 2, \cdots, 2^N - 1$

The index image generation unit 105 obtains the index image $I_N(x,y)$ as the following expression (13) using the function R(k).

$$I_N(x,y) \leftarrow R(P(x,y)) \qquad (13)$$

Specifically, as shown in FIG. 13, corresponding values of R(k) are derived from the values of T(k), and then the generated values of R(k) are sequentially arranged according to the pixels, thereby generating $I_N(x,y)$ as shown in FIG. 14.

After generating the index image $I_N(x,y)$, the index image generation unit 105 outputs the index image $I_N(x,y)$ to the outside of the bit depth transform device 100 (arrow 127 in FIG. 1).

At this time, the index image generation unit 105 separates the index image into upper bit information $I_M(x,y)$ and difference information $I_L(x,y)$. Specifically, the index image generation unit 105 cuts off the M+1th bit of the index image $I_N(x,y)$ and generates upper M bit image $I_M(x,y)$ as the following expression (14). Further, the index image generation unit 105 generates difference information $I_L(x,y)$ using lower N−M bits of the index as the following expression (15).

$$I_M(x, y) = \lfloor I_L(x, y)/2^L \rfloor \times 2^L \qquad (14)$$

Where $\lfloor x \rfloor$ indicates the largest integer not exceeding x and $0 \leq I_L(x, y) < 2^L$ $$I_L(x, y) = I_N(x, y) - I_M(x, y) \qquad (15)$$

Where $0 \leq I_L(x, y) < 2^L$

The index image generation unit 105 outputs the index image in the state where it is separated into the upper bit information $I_M(x,y)$ and the difference information $I_L(x,y)$. Further, the index image generation unit 105 outputs the finalized table T'(k) also to the outside of the bit depth transform device 100.

Upon completion of the processing of Step S111, the index image generation unit 105 ends the bit depth transform process.

In the above-described manner, the bit depth transform device 100 can represent a high bit depth image without a loss (enables lossless representation).

<2. Second Embodiment>
[Bit Depth Inverse Transform Device]

Figure 15:
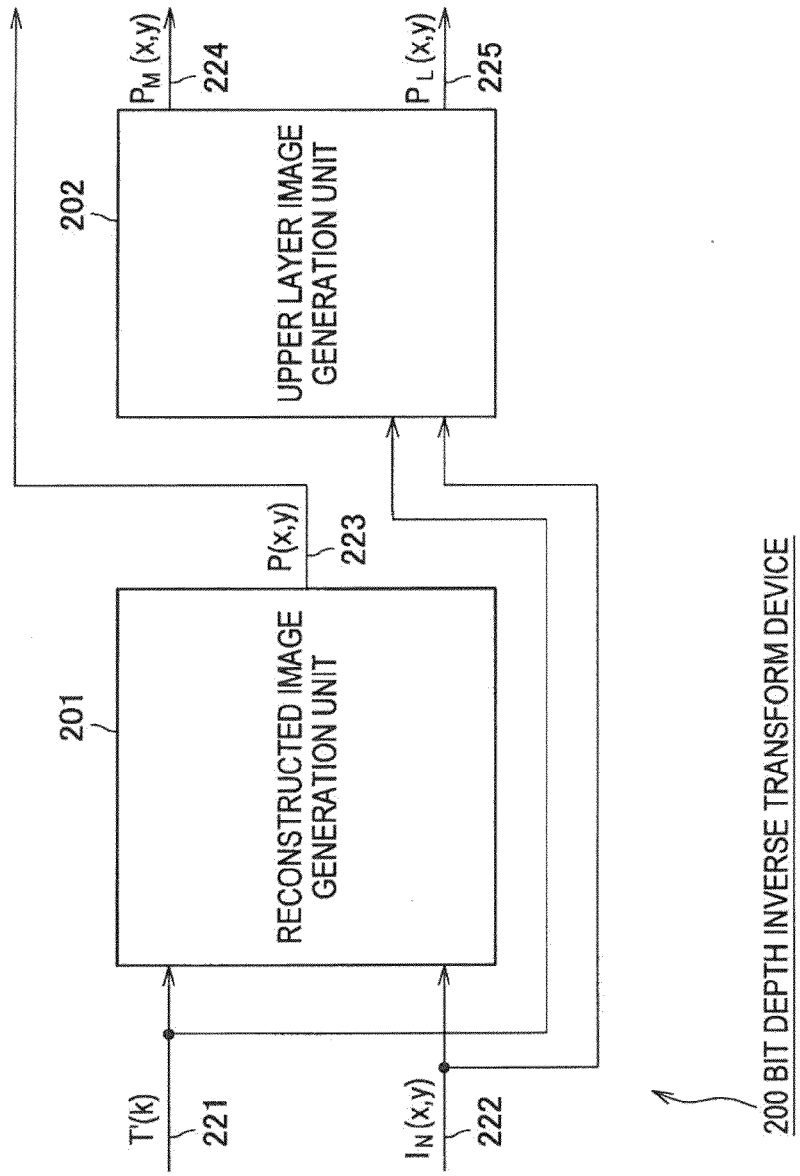
FIG. 15 is a block diagram showing a typical configuration example of a bit depth inverse transform device.

FIG. 15 is a block diagram showing a typical configuration example of a bit depth inverse transform device. A bit depth inverse transform device 200 shown in FIG. 15 is an image processing device corresponding to the bit depth transform device 100 of FIG. 1. The bit depth inverse transform device 200 generates a reconstructed image with a specified bit depth using the index image $I_N(x,y)$ generated by the bit depth transform device 100.

As shown in FIG. 15, the bit depth inverse transform device 200 includes a reconstructed image generation unit 201 and an upper layer image generation unit 202.

[Flow of Bit Depth Inverse Transform Process]

Figure 16:
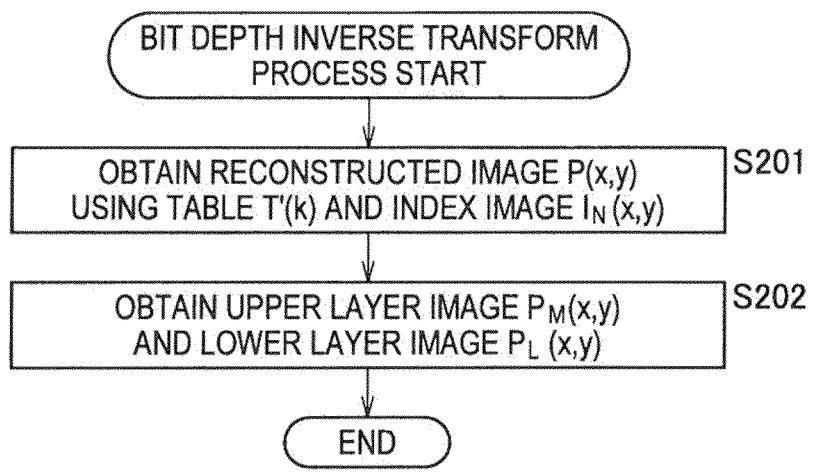
FIG. 16 is a flowchart to explain an example of a flow of a bit depth inverse transform process.

Processing executed by each element of the bit depth inverse transform device 200 is described through description of an example of a flow of a bit depth inverse transform process with reference to a flowchart of FIG. 16.

The finalized table T'(k) and the index image $I_N(x,y)$ that are output from the bit depth transform device 100 are supplied to the bit depth inverse transform device 200. The reconstructed image generation unit 201 and the upper layer image generation unit 202 acquire the finalized table T'(k) and the index image $I_N(x,y)$ (including the upper bit information $I_M(x,y)$ and the difference information $I_L(x, y)$) (arrow 221 and arrow 222 in FIG. 15).

After acquiring the finalized table T'(k) and the index image $I_N(x,y)$, the reconstructed image generation unit 201 obtains a reconstructed image P(x,y) using them as shown in the following expression (16).

$$P(x, y) = T'(I_N(x, y)) \qquad (16)$$

The reconstructed image generation unit 201 outputs the obtained reconstructed image P(x,y) to the outside of the bit depth inverse transform device 200 (arrow 223 in FIG. 15).

In Step S202, the upper layer image generation unit 202 obtains an upper layer image $P_M(x,y)$ and a lower layer image $P_L(x,y)$ using the finalized table T'(k), the upper bit information $I_M(x,y)$ and the difference information $I_L(x,y)$. The upper layer image $P_M(x,y)$ is a reconstructed image obtained from upper M (M<N) bits of each pixel value of the index image $I_N(x,y)$ (i.e. the upper bit information $I_M(x,y)$). The lower layer image $P_L(x,y)$ is reconstructed image obtained from lower L (L=N−M) bits of each pixel value of the index image $I_N(x,y)$ (i.e. difference information $I_L(x,y)$).

The upper layer image generation unit 202 obtains the upper layer image $P_M(x,y)$ using the upper bit information $I_M(x,y)$ as shown in the following expression (17).

$$P_M(x, y) = T'(I_M(x, y)) \qquad (17)$$

This processing is equivalent to using $2^M$ number of table values among $2^N$ number of existing table values.

The upper layer image generation unit 202 obtains the lower layer image $P_L(x,y)$ using the difference information $I_L(x,y)$ in the same manner as shown in the above expression (17). This processing is equivalent to using $2^L$ number of table values among $2^N$ number of existing table values.

The upper layer image generation unit 202 outputs the obtained upper layer image $P_M(x,y)$ and the lower layer image $P_L(x,y)$ to the outside of the bit depth inverse transform device 200 (arrow 224 and arrow 225 in FIG. 15).

Upon completion of the processing of Step S202, the upper layer image generation unit 202 ends the bit depth inverse transform process.

In the above-described manner, the bit depth inverse transform device 200 can obtain the reconstructed image P(x,y) (including the upper layer image $P_M(x,y)$ and the lower layer image $P_L(x,y)$) from the index image $I_N(x,y)$.

From the mapping guideline, a difference image $I_L(x,y)$ for pixel values with high frequency is zero. For those pixel values, reconstruction into correct table values is made. However, when the value of M becomes smaller, the probability that the value of the difference image $I_L(x,y)$ is not zero increases. As a result, the probability that a value that is not the original pixel value is reconstructed increases, which leads to a decrease in PSNR of a reconstructed image. In this case, instead of using the table value T(k) directly, the average of table values corresponding to the same index value may be used as a pixel value of a reconstructed image as shown in the following expression (18). This can suppress a decrease in PSNR.

$$P_M(x, y) = \frac{1}{2^L} \sum_{q=0}^{2^L-1} T(I_M(x, y) + q) \qquad (18)$$

Further, in the case where the original HDR image is very sparse and the number $u_0$ of use of initial table is smaller than the number $2^M$ of luminance that can be represented in an upper bit image, the difference image $I_L(x,y)$ is all zero. As a result, $P_M(x,y)=P(x,y)$ in the above expression (17), PSNR is infinite.

[Efficient Representation of Table Value T(K)]

Note that the table value T(k) has N-bit information each. However, in this technology, because the order of luminance is preserved as shown in the above expression (4), the table T(k) has a relationship of monotone increase. Thus, a difference $T_d(k)$ from the previous table value may be calculated as shown in the following expression (19).

$$T_d(k) = \begin{cases} T(k) & (k = 0) \\ T(k) - T(k-1) & (k = 1, 2, \cdots, N-1) \end{cases} \quad (19)$$

By storing the difference $T_d(k)$ in the table value rather than directly storing the table T(k), the amount of data required for the table can be reduced.

<3. Third Embodiment>

[Bit Depth Transform Device]

Figure 17:
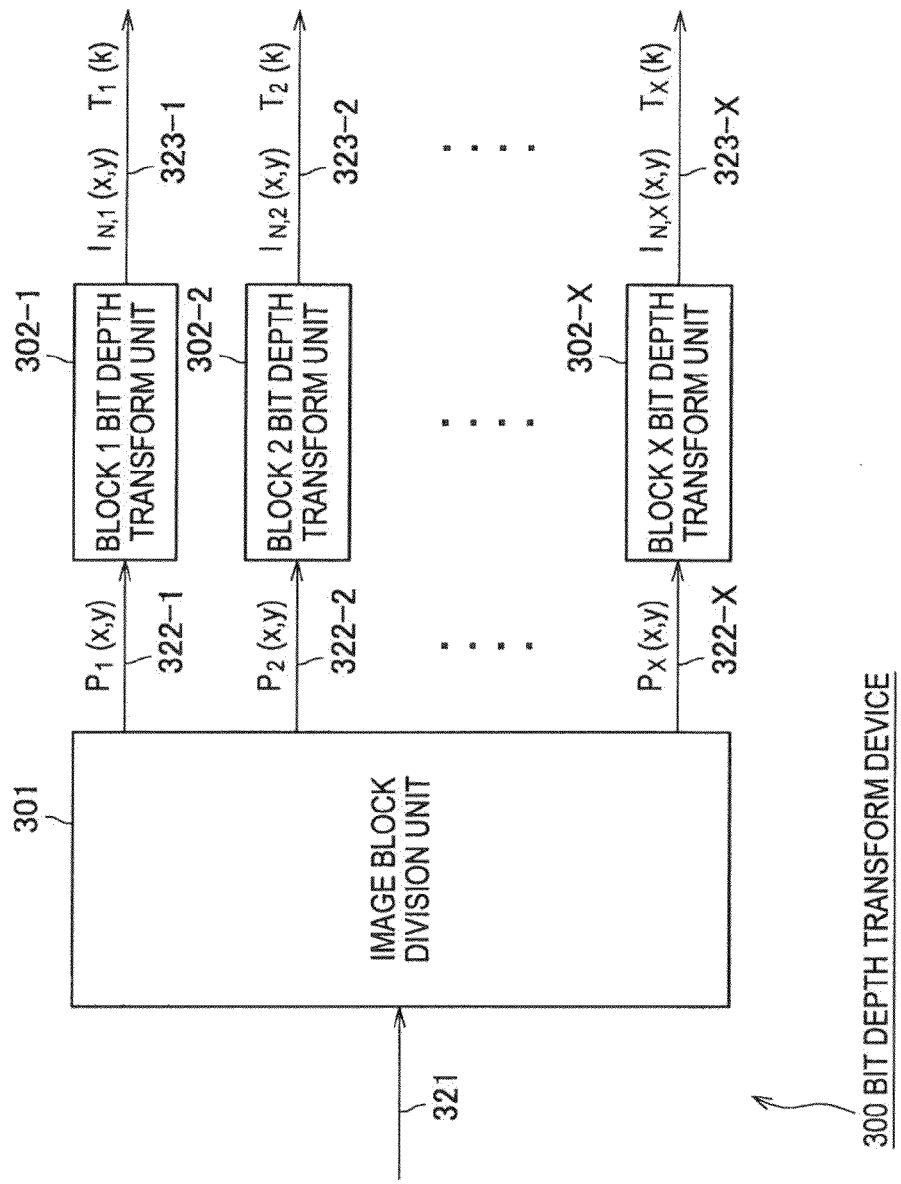
FIG. 17 is a block diagram showing another configuration example of a bit depth transform device.

FIG. 17 is a block diagram showing another configuration example of a bit depth transform device. A bit depth transform device 300 shown in FIG. 17 is an image processing device that divides a high bit depth image into a plurality of blocks and generates an index image for each block.

As shown in FIG. 17, the bit depth transform device 300 includes an image block division unit 301, a block 1 bit depth transform unit 302-1, a block 2 bit depth transform unit 302-2, ..., and a block X bit depth transform unit 302-X.

The image block division unit 301 divides an input high bit depth image (arrow 321) into a plurality of blocks and supplies images of the respective blocks to the block 1 bit depth transform unit 302-1, the block 2 bit depth transform unit 302-2, ..., and the block X bit depth transform unit 302-X.

Specifically, the image block division unit 301 supplies an image $P_1(x,y)$ of a block 1 to the block 1 bit depth transform unit 302-1 (arrow 322-1 in FIG. 17), for example. Further, the image block division unit 301 supplies an image $P_2(x,y)$ of a block 2 to the block 2 bit depth transform unit 302-2 (arrow 322-2 in FIG. 17), for example. Further, the image block division unit 301 supplies an image $P_x(x,y)$ of a block X to the block X bit depth transform unit 302-X (arrow 322-X in FIG. 17), for example.

The block 1 bit depth transform unit 302-1, the block 2 bit depth transform unit 302-2, ..., and the block X bit depth transform unit 302-X are processing units that have the same configuration and perform the same processing as the bit depth transform device 100 of FIG. 1. The block 1 bit depth transform unit 302-1, the block 2 bit depth transform unit 302-2, ..., and the block X bit depth transform unit 302-X perform the same processing as the bit depth transform device 100 for images of their corresponding blocks independently of one another.

Specifically, the block 1 bit depth transform unit 302-1 performs the bit depth transform processing on the image $P_1(x,y)$ of the block 1 and outputs an index image $I_{N,1}(x,y)$ of the block 1 and a table $T_1(k)$ of the block 1 to the outside of the bit depth transform device 300 (arrow 323-1 in FIG. 17), for example. Further, the block 2 bit depth transform unit 302-2 performs the bit depth transform processing on the image $P_2(x,y)$ of the block 2 and outputs an index image $I_{N,2}(x,y)$ of the block 2 and a table $T_2(k)$ of the block 2 to the outside of the bit depth transform device 300 (arrow 323-2 in FIG. 17), for example. Further, the block X bit depth transform unit 302-X performs the bit depth transform processing on the image $P_x(x,y)$ of the block X and outputs an index image $I_{N,x}(x,y)$ of the block X and a table $T_x(k)$ of the block X to the outside of the bit depth transform device 300 (arrow 323-X in FIG. 17), for example.

[Flow of Bit Depth Transform Process]

Figure 18:
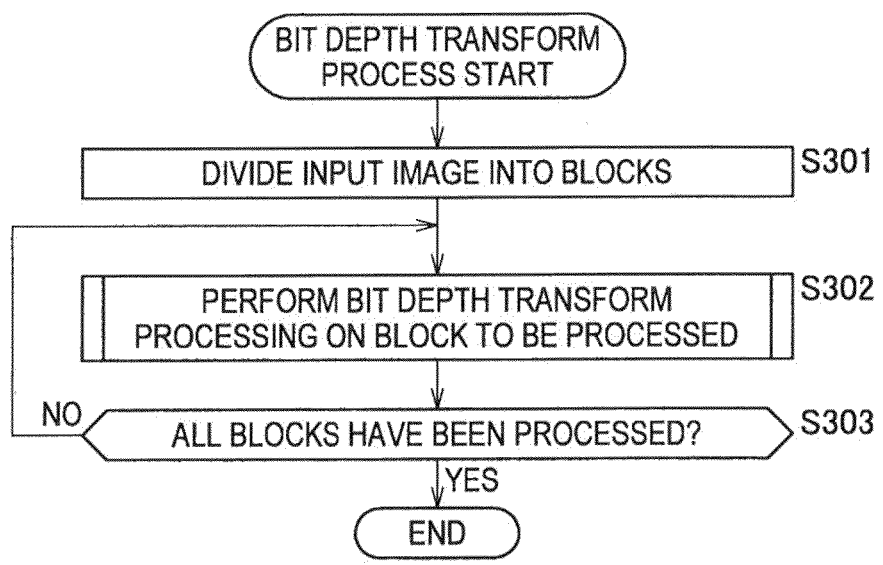
FIG. 18 is a flowchart to explain another example of a flow of a bit depth transform process.

An example of a flow of a bit depth transform process in this case is described hereinafter with reference to a flowchart of FIG. 18.

In Step S301, the image block division unit 301 divides an input image p(x,y) into X number of block images $P_1(x,y)$ to $P_x(x,y)$. In Step S302, processing units in the block 1 bit depth transform unit 302-1 to the block X bit depth transform unit 302-X which respectively correspond to blocks to be processed perform the same bit depth transform process as described earlier with reference to the flowchart of FIG. 4 on the blocks to be processed. The processing of Step S302 is repeated until it is determined in Step S303 that all blocks have been processed.

Specifically, the block 1 bit depth transform unit 302-1 first performs the bit depth transform processing on the block 1, the block 2 bit depth transform unit 302-2 then performs the bit depth transform processing on the block 2, and the processing is performed in the same manner on blocks after the block 3. Finally, the block X bit depth transform unit 302-X performs the bit depth transform processing on the block X. After that, when it is determined in Step S303 that the bit depth transform processing has been performed on all blocks from the block 1 to the block X, the bit depth transform device 300 ends the bit depth transform process.

By the above process, the index images $I_{N,1}(x,y)$ to $I_{N,x}(x,y)$ and the tables $T_1(k)$ to $T_x(k)$ are generated. The index image and the table are thereby generated for each block.

In the above-described manner, the bit depth transform device 300 can represent a high bit depth image without a loss (enables lossless representation).

<4. Fourth Embodiment>

[Bit Depth Inverse Transform Device]

Figure 19:
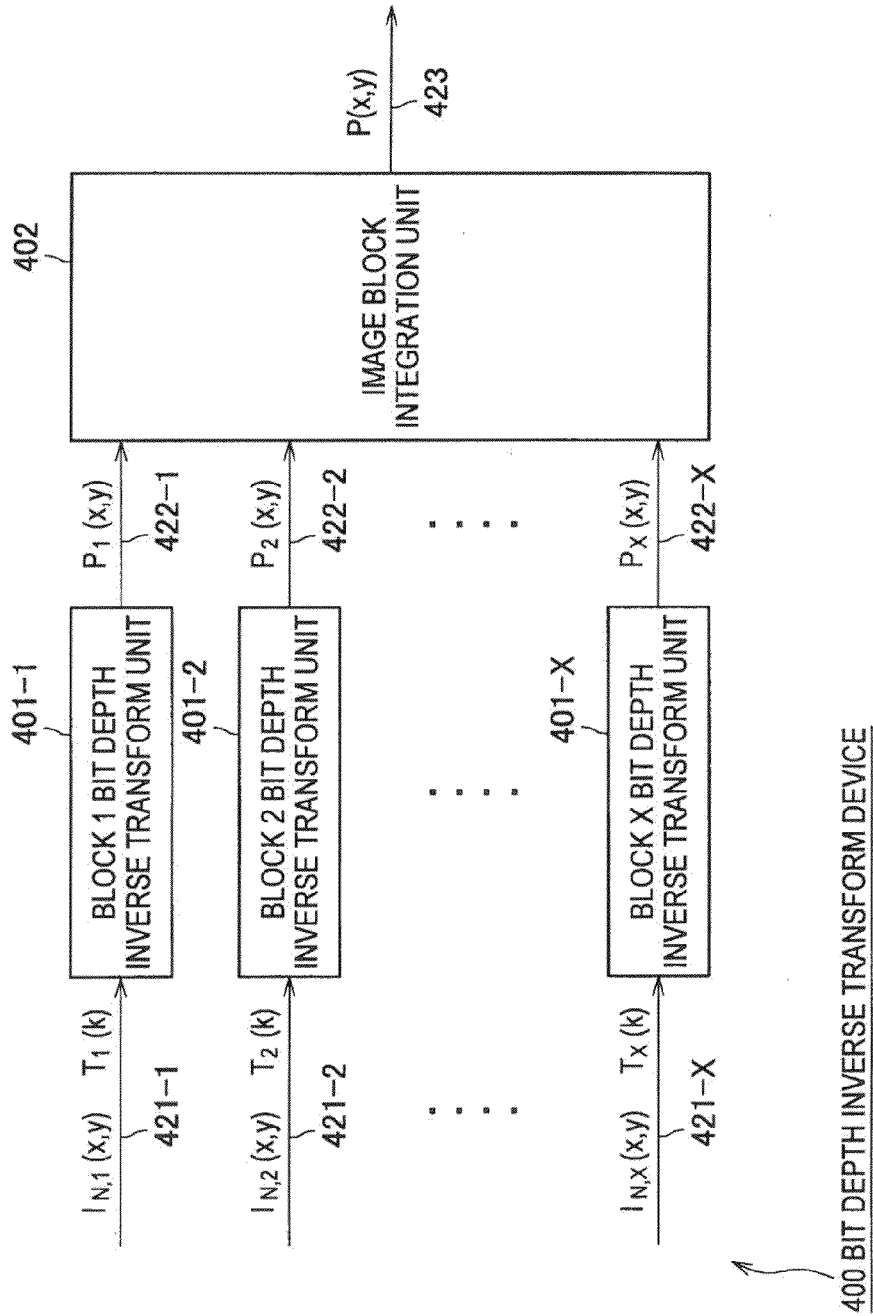
FIG. 19 is a block diagram showing another configuration example of a bit depth inverse transform device.

FIG. 19 is a block diagram showing a typical configuration example of a bit depth inverse transform device. A bit depth inverse transform device 400 shown in FIG. 19 is an image processing device corresponding to the bit depth transform device 300 of FIG. 17. The bit depth inverse transform device 400 generates a reconstructed image using the index image of each block generated by the bit depth transform device 300.

As shown in FIG. 19, the bit depth inverse transform device 400 includes a block 1 bit depth inverse transform unit 401-1, a block 2 bit depth inverse transform unit 401-2, a block X bit depth inverse transform unit 401-X, and an image block integration unit 402.

The block 1 bit depth inverse transform unit 401-1, the block 2 bit depth inverse transform unit 401-2, ..., and the block X bit depth inverse transform unit 401-X respectively acquire index images and tables of their corresponding blocks.

Specifically, the block 1 bit depth inverse transform unit 401-1 acquires the index image $I_{N,i}(x,y)$ and the table $T_1(k)$ of the block 1 generated by the bit depth transform device 300 (arrow 421-1 in FIG. 19), for example. Further, the block 2 bit depth inverse transform unit 401-2 acquires the index image $1_{N,2}(x,y)$ and the table $T_2(k)$ of the block 2 generated by the bit depth transform device 300 (arrow 421-2 in FIG. 19), for example. Further, the block X bit depth inverse transform unit 401-X acquires the index image $I_{N,x}(x,y)$ and the table $T_x(k)$ of the block X generated by the bit depth transform device 300 (arrow 421-X in FIG. 19), for example.

The block 1 bit depth inverse transform unit 401-1, the block 2 bit depth inverse transform unit 401-2, and the block X bit depth inverse transform unit 401-X respectively obtain reconstructed images of their corresponding blocks independently of one another using the acquired index images and tables.

Specifically, the block 1 bit depth inverse transform unit 401-1 generates a reconstructed image $P_x(x,y)$ of the block 1 using the index image $I_{N,1}(x,y)$ and the table $T_1(k)$, for example. Further, the block 2 bit depth inverse transform unit 401-2 generates a reconstructed image $P_2(x,y)$ of the block 2 using the index image $I_{N,2}(x,y)$ and the table $T_2(k)$, for example. Further, the block X bit depth inverse transform unit 401-X generates a reconstructed image $P_x(x,y)$ of the block X using the index image $I_{N,x}(x,y)$ and the table $T_x(k)$, for example.

The block 1 bit depth inverse transform unit 401-1, the block 2 bit depth inverse transform unit 401-2, . . . , and the block X bit depth inverse transform unit 401-X respectively supply the obtained reconstructed images to the image block integration unit 402.

Specifically, the block 1 bit depth inverse transform unit 401-1 supplies the reconstructed image $P_x(x,y)$ of the block 1. to the image block integration unit 402 (arrow 422-1 of FIG. 19), for example. Further, the block 2 bit depth inverse transform unit 401-2 supplies the reconstructed image $P_2(x,y)$ of the block 2 to the image block integration unit 402 (arrow 422-2 of FIG. 19), for example. Further, the block X bit depth inverse transform unit 401-X supplies the reconstructed image $P_x(x,y)$ of the block X to the image block integration unit 402 (arrow 422-X of FIG. 19), for example.

The image block integration unit 402 integrates the supplied reconstructed images of the respective blocks to generate one reconstructed image $P(x,y)$ and supplies it to the outside of the bit depth inverse transform device 400 (arrow 423 of FIG. 19).

[Flow of Bit Depth Inverse Transform Process]

Figure 20:
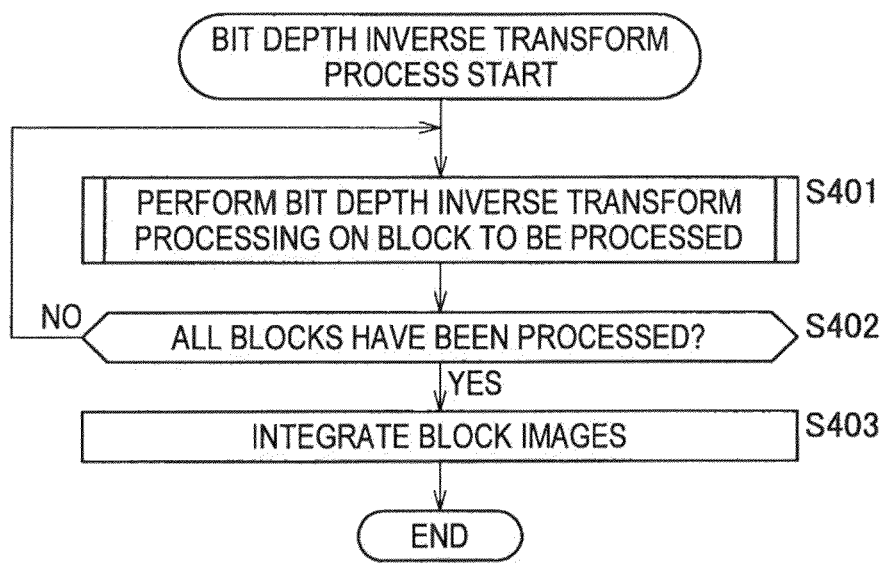
FIG. 20 is a flowchart to explain another example of a flow of a bit depth inverse transform process.

An example of a flow of a bit depth inverse transform process in this case is described hereinafter with reference to a flowchart. of FIG. 20.

In Step S401, processing units in the block 1 bit depth inverse transform unit 401-1 to the block X bit depth inverse transform unit 401-X which respectively correspond to blocks to be processed perform the same bit depth inverse transform process as described earlier with reference to the flowchart of FIG. 16 on the blocks to be processed. The processing of Step S401 is repeated until it is determined in Step S402 that all blocks have been processed.

Specifically, the block 1 bit depth inverse transform unit 401-1 first performs the bit depth inverse transform processing on the block 1, the block 2 bit depth inverse transform unit 401-2 then performs the bit depth inverse transform processing on the block 2, and the processing is performed in the same manner on blocks after the block 3. Finally, the block X bit depth inverse transform unit 401-X performs the bit depth inverse transform processing on the block X. After that, when it is determined in Step S402 that the bit depth inverse transform processing has been performed on all blocks from the block 1 to the block X, the bit depth inverse transform device 400 moves the process forward to Step S403.

In Step S403, the image block integration unit 402 integrates the reconstructed images of the respective blocks generated in Step S401 to generate one reconstructed image, and then ends the bit depth inverse transform process.

In the above-described manner, the bit depth inverse transform device 400 can obtain the reconstructed image $P(x,y)$ from the index images $I_{N,Block}(x,y)$ generated for the respective blocks. Note that the bit depth inverse transform device 400 may generate the upper layer image $P_M(x,y)$ and the lower layer image $P_L(x,y)$ in the same way as the case of the bit depth inverse transform device 200.

In this case, the block 1 bit depth inverse transform unit 401-1 to the block X bit depth inverse transform unit 401-X obtain upper layer images $P_{M,Block}(x,y)$ and lower layer images $P_{L,Block}(x,y)$ for the respective blocks, and the image block integration unit 402 integrates the upper layer images $P_{M,Block}(x,y)$ and the lower layer images $P_{L,Block}(x,y)$ of the respective blocks to generate the upper layer image $P_M(x,y)$ and the lower layer image $P_L(x,y)$ of the whole image.

The third embodiment and the fourth embodiment described above are description of image processing in the case of dividing an image into a plurality of blocks. The deviation of the histogram shown in FIG. 6 becomes greater when the image is divided into a plurality of blocks as a matter of course, and therefore the range of pixel values can be represented with a smaller number of bits. Consequently, degradation of image quality due to the bit reduction by quantization according to the third embodiment and the fourth embodiment is further reduced.

However, because it is necessary to transmit a plurality of tables $T_1(K)$ to $T_x(K)$ for X blocks in this case, the first embodiment and the second embodiment in which it is necessary to transmit only one table $T(k)$ can better suppress an increase in the amount of codes.

<5. Fifth Embodiment>

[Text Example]

In this embodiment, an example of test results of two test images (bit depth N=12) shown in FIGS. 21A and 21B for the bit depth transform and inverse transform methods in the above-described embodiments is described. As a result of histogram extraction, the number of nonzero pixels $u_0=1853$ in a medial image shown in FIG. 21A, and the number of nonzero pixels $u_0=2981$ in a photographic image shown in FIG. 21B. Thus, because $2^{11}$ (=2048)>1853, completely lossless representation is possible with M=11 bits in the medial image shown in FIG. 21A. Therefore, with use of the method of the disclosure, the original image can be completely reconstructed only with the upper layer index image $I_M(x,y)$ with upper M bits (PSNR=∞). On the other hand, in the case of Lloyd-Max method, reconstruction of the original image fails without difference information under the same conditions.

The test results of the medial image of FIG. 21A are shown in the table of FIG. 22. In the table of FIG. 22, the vertical axis indicates the type of processing, and the horizontal axis indicates the number of bits M of the upper layer. Method-A and Method-B are described hereinbelow.

In the test, an N-bit image is first reconstructed using only the upper bit image $I_M(x,y)$ with M bits and the table T'(k). As a matter of course, a reconstructed image is degraded compared to the original image because there is no information of the lower layer. In this example, the degree of image degradation is assessed, with the value of M varying from 8 to 11.

Method-A: method implemented by the above-described expression (17), use the table T'(k) directly.

Method-B: use the average of table values as shown in the above-described expression (18)

Further, the method that divides an image into a plurality of blocks and then separates them into an upper layer and a lower layer according to the third embodiment and the fourth embodiment is Method-A (block division) and Method-B (block division) in the table of FIG. 22.

In Method-A in this case, PSNR is lower compared to Lloyd-Max method or rounding with a decrease in the value of M. This is because an error between the original pixel value and the table becomes larger. In Method-B using the table average in this case, this problem is overcome.

Referring to the table of FIG. 22, in Method-B (block division), PSNR is higher compared to Lloyd-Max method, which has been considered to be the best, at all values except M=8. Especially, the table shows that the advantage over Lloyd-Max method is great at M=10 or more. Further, complete lossless can be achieved at M=11 bits in this method as described earlier.

The test results of the photographic image of FIG. 21B are shown in the table of FIG. 23. In Method-B (block division), PSNR is higher compared to Lloyd-Max method at values of M=10 or more. On the other hand, PSNR is significantly lower compared to Lloyd-Max method at M=8. In this manner, an error between the original pixel value and the table tends to become larger when a difference between N and M becomes larger to a certain extent.

Therefore, for example, a bit depth transform device may include a Lloyd-Max quantization unit that performs quantization (bit depth transform) by Lloyd-Max method, a present method quantization unit that has the same configuration as the bit depth transform device 300 of FIG. 17 and performs the same processing (quantization by Method-B (block division)), and a control unit that selects a quantization (bit depth transform) method. In this bit depth transform device, when, as a result of histogram measurement, the number of pixels X of which occurrence frequency is equal to or more than one satisfies $X>2^{M}-1$ and $(N-M) \geq P$ (P is two, for example), the control unit selects Lloyd-Max method and controls the Lloyd-Max quantization unit to perform the bit depth transform (quantization) by Lloyd-Max method, and, in other cases, the control unit selects Method-B (block division) and controls the present method quantization unit to perform the bit depth transform (quantization) by Method-B (block division). This enables the most appropriate bit representation at all times. Note that the inverse transform may be performed by a method according to the selected method. Further, the method to be switched with Lloyd-Max method may be the present method other than Method-B (block division) as a matter of course.

[Constraints of Expression (4)]

The necessity of constraints imposed on the table values in the above-described expression (4) is examined hereinbelow. Assume that the expression (4) is ignored at the time of creating the upper image $I_M(x,y)$ with M bits, and the index image $I_N(x,y)$ is created only on the condition of minimizing MSE of the expression (3).

FIG. 24 shows PSNR of an upper bit image $I_M(x,y)$ for an index image $I_N(x,y)$ and PSNR of a reconstructed image $P_M(x,y)$ for an original image $P(x,y)$. As is obvious from the table of FIG. 24, in the case of minimizing only MSE, while PSNR of the upper bit image is high, PSNR of the reconstructed image is very low. It is thus desirable to apply constraints of the expression (4).

Further, the amount of data of the table is examined hereinbelow. In this technology, by applying the above-described expression (4), it is possible to save the difference $T_d(k)$ ($0 \leq k < N$) of table values in the expression (19), instead of the table $T(k)$.

FIGS. 25 and 26 show results of writing $T_d(k)$ in binary and performing data compression using the bzip2 algorithm. Because the size of the table does not change with a change in the value of M in this technology, the data size of T(k) is 16 bits (12 bits in substance)×$2^N$, which is 8192 bytes as a whole.

On the other hand, for the table of Lloyd-max also, a difference from the previous table value is calculated and the same processing is performed as shown in FIGS. 25 and 26. This data size depends on the number of bits M of an upper image. Further, the amount of data for representing a lower layer is not included in the amount of data of the Lloyd-max table.

Note that the size in the case of directly compressing the table value T(k) of the present technology is also shown in FIGS. 25 and 26.

The advantage of saving $T_d(k)$ rather than directly saving T(k) can be seen from FIGS. 25 and 26. In this technology, despite that all $2^N$ number of table values are saved, the amount of data is substantially the same as that of Lloyd-max which saves $2^M$ number of values.

<6. Sixth Embodiment>

[Image Processing Device]

FIG. 27 shows a specific implementation of an image processing device in which the devices described in the first to fourth embodiments are used as processing units. Those elements are incorporated into a camera system, for example.

An image processing device 500 shown in FIG. 27 includes a bit depth transform processing unit 501, a storage unit 502, and a bit depth inverse transform processing unit 503.

An image (N bits) captured by an image sensor (for example, CCD, CMOS sensor or the like) incorporated in a camera is supplied to the bit depth transform processing unit 501 (arrow 521 in FIG. 27). The bit depth transform processing unit 501 separates the image sensor image into an upper layer with M bits (N>M) and a remaining lower layer by the method described in the first embodiment or the third embodiment.

The M-bit image (index image $I_M(x,y)$) is supplied to the storage unit 502 (arrow 522 in FIG. 27) and stored (saved). In a common digital camera, a typical method is to read image data from the storage unit 502, which is an, internal memory, perform JPEG compression, and record the compressed file into an external memory card or the like. This is not described in further detail so as not to distract from the main subject.

The image data of M bits that is read out of the storage unit 502 is supplied to the bit depth inverse transform processing unit 503 (arrow 523 in FIG. 27). The bit depth inverse transform processing unit 503 transforms the image data into N bits again. A reconstructed image (N bits) after transform is supplied to the display unit 504 that is capable of N-bit display (arrow 524 in FIG. 27), for example. The display unit 504 displays the supplied reconstructed image.

As described above, by reducing the number of bits of the bit depth of the index image, a required memory capacity can be reduced. This suppresses an increase in manufacturing cost and power consumption.

Each device described above may include elements other than those described above as a matter of course. Further, the device may be configured as a system composed of a plurality of devices, not limited to be a single device. For example, the device may be configured as an equipment or device using images captured from an image sensor (CCD, CMOS sensor), compression circuit before image sensor images are written into memory, digital still camera, video camcorder, medical camera, medical endoscope, monitoring camera, digital cinema shooting camera, binocular camera, multi-lens camera, memory reduction circuit in LSI chip, authoring tool on PC or other software modules.

<7. Seventh Embodiment>

[Personal Computer]

The above-described processes may be executed by hardware or software. In this case, a personal computer as shown in FIG. 28 may be configured to execute the processes, for example.

In FIG. 28, a CPU (Central Processing Unit) 601 of a personal computer 600 executes various kinds of processing according to a program stored in a ROM (Read Only Memory) 602 or a program loaded from a storage unit 613 to a RAM (Random Access Memory) 603. Data necessary for the CPU 601 to execute various kinds of processing and the like are also stored in the RAM 603.

The CPU 601, the ROM 602 and the RAM 603 are connected to one another through a bus 604. An input/output interface 610 is also connected to the bus 604.

To the input/output interface 610, an input unit 611 including a keyboard, mouse and the like, an output unit 612 including a display such as a CRT (Cathode Ray Tube) display or LCD (Liquid Crystal Display), speaker and the like, a storage unit 613 including SSD (Solid State Drive) such as flash memory, hard disk and the like, and a communication unit 614 including an interface of a wired LAN (Local Area Network) or wireless LAN, modem and the like are connected. The communication unit 614 performs communication processing through a network including Internet.

A driver 615 is also connected to the input/output interface 610 according to need. A removable medium 621 such as a magnetic disk, optical disk, magneto-optical disk or semiconductor memory is inserted to the driver 615 as appropriate, and a computer program read out of the removable medium 621 is installed into the storage unit 613 according to need.

In the case of executing the above-described processes by software, a program constituting the software is installed from a network or a recording medium.

The recording medium is not limited to be the removable medium 621 including a magnetic disk (including flexible disk), optical disk (including CD-ROM (Compact Disc-Read Only Memory), DVD (Digital Versatile Disc)), magneto-optical disk (including MD (Mini Disc)) or composed of semiconductor memory or the like which stores a program and which is provided to deliver the program to users separately from the device, and it may be the ROM 602 which stores a program or a hard disk included in the storage unit 613 or the like which is provided to users being incorporated into the device as shown in FIG. 28, for example.

It should be understood by those skilled in the art that various modifications, combinations, sub-combinations and alterations may occur depending on design requirements and other factors insofar as they are within the scope of the appended claims or the equivalents thereof.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in this specification, "system" refers to a whole device composed of a plurality of devices.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

It should be noted that the technology may be configured as follows.

(1) An image processing device which transforms an image with a bit depth of N into an upper layer with a bit depth of M and a remaining lower layer, including:

a histogram generation unit that generates histogram indicating occurrence frequency of each pixel value of an image with a bit depth of N;

a table generation unit that generates a table listing pixel values of which occurrence frequency in the histogram generated by the histogram generation unit is equal to or more than one;

a reordering unit that reorders an arrangement of values in the histogram using the table generated by the table generation unit;

an update unit that updates the table generated by the table generation unit and the histogram reordered by the reordering unit; and an index image generation unit that generates an index image with a bit depth of N using the table and the histogram updated by the update unit.

(2) The image processing device according to (1), wherein the update unit updates the table and the histogram by reordering an arrangement of values in the table and the histogram so as to minimize an error when a lower layer image with (N−M) bits is cut off.

(3) The image processing device according to (1) or (2), further including:

a division unit that divides the image with a bit depth of N into a plurality of blocks, wherein the histogram generation unit generates the histogram independently for each block divided by the division unit, the table generation unit generates the table independently for each block using the histogram of each block generated by the histogram generation unit, the reordering unit reorders the histogram of each block using the table of each block generated by the table generation unit, the update unit updates the table of each block and the histogram of each block reordered by the reordering unit, and the index image generation unit generates the index image independently for each block using the table of each block and the histogram of each block updated by the update unit.

(4) The image processing device according to any one of (1) to (3), further including:

a control unit that selects a method of bit depth transform; and a Lloyd-Max quantization unit that performs quantization by Lloyd-Max method, wherein the control unit detects number of pixels X of which occurrence frequency is equal to or more than one from the histogram generated by the histogram generation unit and, when $X>(2^M-1)$ and $(N-M) \geq P$ are satisfied, controls the Lloyd-Max quantization unit to perform bit depth transform by Lloyd-Max method, and, in other cases, controls the table generation unit, the reordering unit, the update unit and the index image generation unit to generate the index image.

(5) The image processing device according to (4), wherein a value of a variable P is 2.

(6) An image processing method of an image processing device which transforms an image with a bit depth of N into an upper layer with a bit depth of M and a remaining lower layer, including:

generating histogram indicating occurrence frequency of each pixel value of an image with a bit depth of N by a histogram generation unit;

generating a table listing pixel values of which occurrence frequency in the generated histogram is equal to or more than one by a table generation unit;

reordering an arrangement of values in the histogram using the generated table by a reordering unit;

updating the generated table and the reordered histogram by the an update unit; and generating an index image with a bit depth of N using the updated table and the updated histogram by the an index image generation unit.

(7) An image processing device including:

a reconstructed image generation unit that reconstructs an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table; and an upper layer image generation unit that separates the index image with a bit depth of N into an upper layer index image with a bit depth of M and a lower layer index image with (N−M) bits and reconstructs the image with a bit depth of N using the index image with a bit depth of M and the updated table.

(8) The image processing device according to (7), wherein the reconstructed image generation unit reconstructs a block image with a bit depth of N using the index image with a bit depth of N of each block and the updated table of each block.

(9) The image processing device according to (7) or (8), wherein the upper layer image generation unit reconstructs a block image with a bit depth of N using the index image with a bit depth of M of each block and the updated table of each block.

(10) The image processing device according to any one of (7) to (9), wherein the upper layer image generation unit detects number of pixels X of which occurrence frequency is equal to or more than one from the histogram and, when $X \leq (2^M-1)$ is satisfied, separates the index image with a bit depth of N into an upper layer index image with a bit depth of M and a lower layer index image with (N−M) bits.

(11) An image processing method of an image processing device including:

reconstructing an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table, by a reconstructed image generation unit; and separating the index image with a bit depth of N into an upper layer index image with a bit depth of M and a lower layer index image with (N−M) bits and reconstructing the image with a bit depth of N using the index image with a bit depth of M and the updated table, by an upper layer image generation unit.

The present application contains subject matter related to that disclosed in Japanese Priority Patent Application JP 2011-066702 filed in the Japan Patent Office on Mar. 24, 2011, the entire content of which is hereby incorporated by reference.

What is claimed is:

1. An image processing device which transforms an image with a bit depth of N into an upper layer with a bit depth of M and a remaining lower layer, comprising:

a histogram generation unit that generates histogram indicating occurrence frequency of each pixel value of an image with a bit depth of N;

a table generation unit that generates a table listing pixel values of which occurrence frequency in the histogram generated by the histogram generation unit is equal to or more than one;

a reordering unit that reorders an arrangement of values in the histogram using the table generated by the table generation unit;

an update unit that updates the table generated by the table generation unit and the histogram reordered by the reordering unit; and an index image generation unit that generates an index image with a bit depth of N using the table and the histogram updated by the update unit.

2. The image processing device according to claim 1, wherein the update unit updates the table and the histogram by reordering an arrangement of values in the table and the histogram so as to minimize an error when a lower layer image with (N−M) bits is cut off.

3. The image processing device according to claim 1, further comprising:

a division unit that divides the image with a bit depth of N into a plurality of blocks, wherein the histogram generation unit generates the histogram independently for each block divided by the division unit, the table generation unit generates the table independently for each block using the histogram of each block generated by the histogram generation unit, the reordering unit reorders the histogram of each block using the table of each block generated by the table generation unit, the update unit updates the table of each block and the histogram of each block reordered by the reordering unit, and the index image generation unit generates the index image independently for each block using the table of each block and the histogram of each block updated by the update unit.

4. The image processing device according to claim 1, further comprising:

a control unit that selects a method of bit depth transform; and a Lloyd-Max quantization unit that performs quantization by Lloyd-Max method, wherein the control unit detects number of pixels X of which occurrence frequency is equal to or more than one from the histogram generated by the histogram generation unit and, when $X > (2^M-1)$ and $(N-M) \geq P$ are satisfied, controls the Lloyd-Max quantization unit to perform bit depth transform by Lloyd-Max method, and, in other cases, controls the table generation unit, the reordering unit, the update unit and the index image generation unit to generate the index image.

5. The image processing device according to claim 4, wherein a value of a variable P is 2.

6. An image processing method of an image processing device which transforms an image with a bit depth of N into an upper layer with a bit depth of M and a remaining lower layer, comprising:
- generating histogram indicating occurrence frequency of each pixel value of an image with a bit depth of N by a histogram generation unit;
- generating a table listing pixel values of which occurrence frequency in the generated histogram is equal to or more than one by a table generation unit;
- reordering an arrangement of values in the histogram using the generated table by a reordering unit;
- updating the generated table and the reordered histogram by the an update unit; and
- generating an index image with a bit depth of N using the updated table and the updated histogram by the an index image generation unit.

7. An image processing device comprising:
- a reconstructed image generation unit that reconstructs an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table; and
- an upper layer image generation unit that separates the index image with a bit depth of N into an upper layer index image with a bit depth of M and a lower layer index image with (N−M) bits and reconstructs the image with a bit depth of N using the index image with a bit depth of M and the updated table.

8. The image processing device according to claim 7, wherein the reconstructed image generation unit reconstructs a block image with a bit depth of N using the index image with a bit depth of N of each block and the updated table of each block.

9. The image processing device according to claim 7, wherein
the upper layer image generation unit reconstructs a block image with a bit depth of N using the index image with a bit depth of M of each block and the updated table of each block.

10. The image processing device according to claim 7, wherein
the upper layer image generation unit detects number of pixels X of which occurrence frequency is equal to or more than one from the histogram and, when $X \leq (2^M - 1)$ is satisfied, separates the index image with a bit depth of N into an upper layer index image with a bit depth of M and a lower layer index image with (N−M) bits.

11. An image processing method of an image processing device comprising:
- reconstructing an image with a bit depth of N using an index image with a bit depth of N generated by generating histogram indicating occurrence frequency of each pixel value of the image with a bit depth of N, generating a table listing pixel values of which occurrence frequency in the generated histogram is equal to or more than one, reordering an arrangement of values in the histogram using the generated table, updating the generated table and the reordered histogram, and using the updated table and the updated histogram, and the updated table, by a reconstructed image generation unit; and
- separating the index image with a bit depth of N into an upper layer index image with a bit depth of M and a lower layer index image with (N−M) bits and reconstructing the image with a bit depth of N using the index image with a bit depth of M and the updated table, by an upper layer image generation unit.

* * * * *